United States Patent
Harano

(10) Patent No.: US 6,771,944 B2
(45) Date of Patent: Aug. 3, 2004

(54) DIVERSITY RECEIVER CONTINUOUSLY RESPONSIVE TO BEST SIGNAL

(75) Inventor: Nobuya Harano, Shizuoka (JP)

(73) Assignee: NEC Corporation, Tokyo (JP)

( * ) Notice: Subject to any disclaimer, the term of this patent is extended or adjusted under 35 U.S.C. 154(b) by 584 days.

(21) Appl. No.: 09/781,411

(22) Filed: Feb. 13, 2001

(65) Prior Publication Data

US 2001/0016477 A1 Aug. 23, 2001

(30) Foreign Application Priority Data

Feb. 17, 2000 (JP) ........................................ 2000-040205

(51) Int. Cl.$^7$ ................................................ H04B 7/08
(52) U.S. Cl. ............................... 455/276.1; 455/277.1; 343/860
(58) Field of Search ................................ 455/273, 275, 455/276.1, 277.1, 283, 286; 343/860, 713, 861

(56) References Cited

U.S. PATENT DOCUMENTS

| | | | |
|---|---|---|---|
| 5,475,875 A | * 12/1995 | Katsuyama et al. | ........ 455/275 |
| 5,940,040 A | * 8/1999 | Koyanagi et al. | ........... 343/702 |
| 6,018,651 A | * 1/2000 | Bruckert et al. | ......... 455/277.1 |
| 6,055,422 A | * 4/2000 | Saitoh | ...................... 455/277.1 |
| 6,360,089 B1 | * 3/2002 | Saitoh | ........................ 340/7.1 |
| 6,611,677 B1 | * 8/2003 | Lindenmeier et al. | ...... 455/135 |

FOREIGN PATENT DOCUMENTS

| | | |
|---|---|---|
| CN | 1121664 A | 5/1996 |
| CN | 1155793 A | 7/1997 |
| EP | 0 680 161 A1 | 11/1995 |
| GB | 2 304 496 A | 3/1997 |
| GB | 2 311 693 A | 10/1997 |
| GB | 2 320 816 A | 7/1998 |
| JP | 4-274625 | 9/1992 |
| JP | 7-7462 | 1/1995 |
| JP | 7-202774 | 8/1995 |
| JP | 7-221681 | 8/1995 |
| JP | 8-265235 | 10/1996 |
| JP | 9-223993 | 8/1997 |
| JP | 10-75192 | 3/1998 |
| JP | 10-285093 | 10/1998 |

OTHER PUBLICATIONS

Japanese Office Action Dated May 21, 2002, with partial translation.

* cited by examiner

Primary Examiner—Edward F. Urban
Assistant Examiner—Blane J. Jackson
(74) Attorney, Agent, or Firm—McGinn & Gibb, PLLC

(57) ABSTRACT

A diversity receiver includes a plurality of antennas, a receiving unit for receiving radio waves via the antennas, a phase adjuster disposed for each said antenna and connected thereto for adjusting a phase angle of a radio wave received by each of the antennas to a value to increase gain of each antenna to which the phase adjuster is not connected, and a switching unit, operative in response to a control signal indicating a selected antenna having a best reception state to receive an external radio wave, for connecting the selected antenna to the receiving unit, for disconnecting the selected antenna from the phase adjuster and non-selected antennas other than the selected antenna, and for connecting the non-selected antennas to the phase adjuster associated therewith. The phase adjuster is connected in a stage subsequent to the switching unit viewed from the antennas. This configuration provides a highly efficient diversity receiver.

64 Claims, 11 Drawing Sheets

F I G. 11
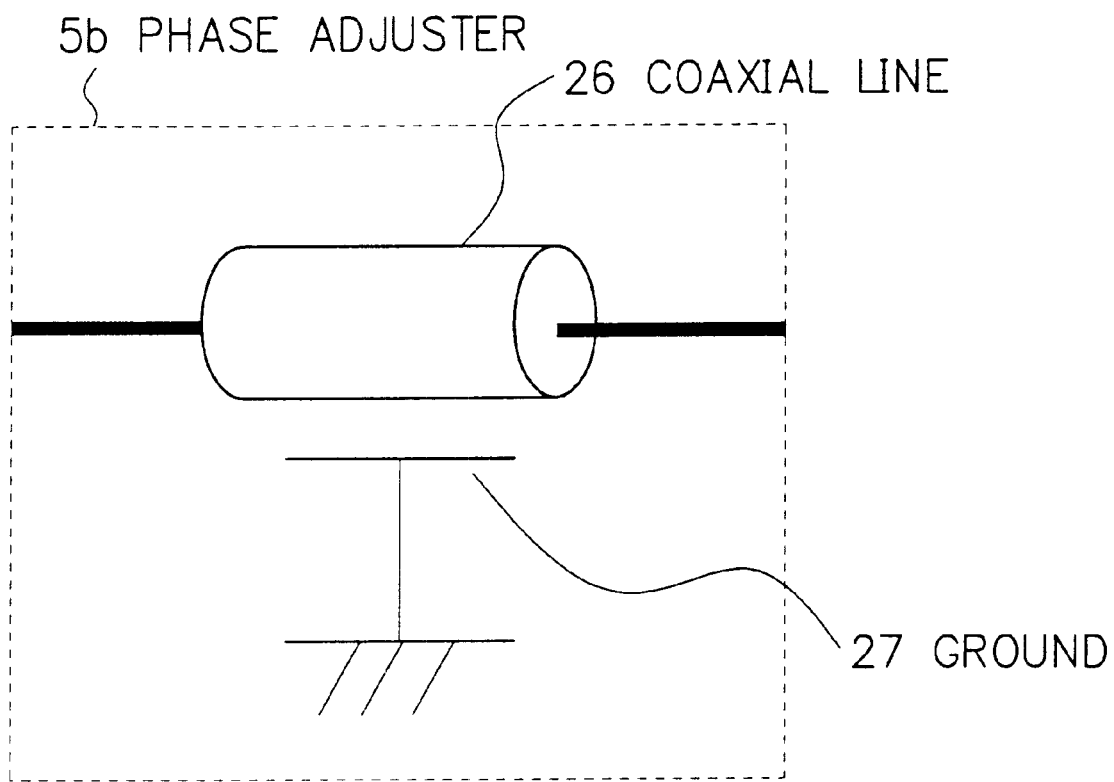

DIVERSITY RECEIVER CONTINUOUSLY RESPONSIVE TO BEST SIGNAL

BACKGROUND OF THE INVENTION

The present invention relates to a receiver using diversity receiving, and in particular, to a diversity receiver including a plurality of antennas.

DESCRIPTION OF THE PRIOR ART

In radio wave receiving, diversity receiving is used to keep a stable receiving state by preventing such phenomena to cause deterioration of the receiving state as a phenomenon of phasing in which a receiving electric field changes in range and phase with respect to time. Of such diversity receiving, space diversity receiving is a scheme based on an event that the electric field varies depending on radio wave receiving points. Specifically, a plurality of antennas are installed to be spatially separated from each other such that output signals from the antennas are combined with each other or are each obtained through a change-over operation therebetween.

For example, a portable lightweight pager increasingly employs the space diversity receiving (to be simply called "diversity" hereinafter). Namely, the pager includes, to obtain good reception characteristics using the limited space, an extendable and retractable whip antenna for transmission and reception and an integrated antenna dedicatedly used for reception. When receiving radio signals, a change-over operation is conducted according to reception states of the antennas between the antennas to receive an output signal from one of the antennas in a better reception state. FIG. 1 shows an actual example of constitution of a pager using the diversity receiving system. The configuration includes a housing 20 and a whip antenna 18 and an integrated antenna 19 installed in the housing 20.

A diversity receiver adopting the antenna change-over operation usually includes one receiving circuit and at least two antennas. The system determines one of the antennas which operates with highest reception reliability and selects an output signal from the antenna in the better reception state in any situation. Accordingly, the diversity receiver continuously operates in an optimal reception state.

Heretofore, in such a diversity receiver, the antennas other than the antenna selected for the good (best) reception state are not connected to any circuits. Namely, these circuits have a terminating condition specified as "open". Therefore, the antennas not selected as above receive a reception wave of the antenna selected for reception. The antennas are hence driven, and reception waves resultant from the driving of the antennas adversely influence reception characteristics of the selected antenna in some cases.

To possibly avoid occurrence of such a phenomenon, Japanese Patent Laid-Open No. Heisei 10-75192 describes a method in which a transmission line length adjuster circuit is inserted between each antenna and an associated switch to keep a state of each antenna in an optimal state.

However, in the prior art described in Japanese Patent Laid-Open No. Heisei 10-75192, when an antenna on a side at which the adjuster circuit is inserted is used for transmission and reception, send and receive signals are respectively transmitted and received via the adjuster circuit from the antenna. This inevitably leads to loss in the transmission line length adjuster circuit.

Additionally, impedance of a termination point of the antenna in a non-selected state depends on characteristics of the change-over switch. There cannot be obtained a reflection characteristic under an optimal terminating condition. This causes a standing wave and hence noise takes place to lower efficiency of the system depending on cases.

SUMMARY OF THE INVENTION

It is therefore an object of the present invention, which has been devised to solve the problems, to provide a highly efficient diversity receiver in which a transmission path length adjuster circuit, namely, a phase adjuster circuit is arranged after a change-over switch relative to or viewed from an antenna to avoid influence of loss in the phase adjuster circuit and a terminator reflection coefficient adjuster circuit is disposed at a terminating point to obtain an optimal reflection characteristic.

In accordance with the present invention, there is provided configurations to solve the problems as follows.

In accordance with one aspect of the present invention, there is provided a diversity receiver including a plurality of antennas, a receiving means for receiving radio waves via said antennas, plurarity of phase adjuster means disposed for each said antenna and connected thereto for adjusting a phase angle of a radio wave received by each said antenna to a value to increase gain of each said antenna to which said phase adjuster means is not connected, and switching means, operative in response to a control signal (S1, S3) indicating a selected antenna having a best reception state to receive an external radio wave, for connecting said selected antenna to said receiving means, for disconnecting said selected antenna from said phase adjuster means and non-selected antennas other than said selected antenna, and for connecting said non-selected antennas to said phase adjuster means associated therewith. The phase adjuster means is connected in a stage subsequent to said switching means viewed from said antennas.

In accordance with one aspect of the present invention, the diversity receiver further includes terminating means disposed for each said antenna and connected thereto for terminating a transmission line and terminating resistor reflection coefficient adjuster means disposed for each said terminating means in a stage after said phase adjuster and before said terminating means for adjusting a reflection coefficient for an input signal fed to said terminating means to a larger value.

In accordance with one aspect of the present invention, the diversity receiver further includes transmitting means for transmitting a signal to said antennas. The switching means connects, in response to a control signal (S2) externally inputted to indicate a transmission state, said transmitting means only to antennas assigned for transmission among said antennas.

In accordance with one aspect of the present invention, said terminating means of the diversity receiver is a resistor.

In accordance with one aspect of the present invention, said terminating resistor reflection adjuster means of the diversity receiver includes a capacitor and a coil.

In accordance with one aspect of the present invention, said terminating resistor reflection adjuster means of the diversity receiver includes a reactance (coil(s)) connected in series between an input thereof and an output thereof and a capacitor connected in parallel between an end of said coil and ground.

In accordance with one aspect of the present invention, said phase adjuster means of the diversity receiver includes capacitors and a reactance (coil(s)).

In accordance with one aspect of the present invention, said phase adjuster means of the diversity receiver includes a strip line or a coaxial line.

In accordance with one aspect of the present invention, each said capacitors of the diversity receiver is a chip capacitor.

In accordance with one aspect of the present invention, the diversity receiver further includes determining and controlling means for detecting a state of a radio wave received by each said antenna, for selecting one of said antenna in a best reception state, and for producing the control signal (S1, S3) indicating said selected antenna or the control signal (S2) indicating a transmission state.

In accordance with one aspect of the present invention, there is provided a transceiver comprising the diversity receiver.

In accordance with one aspect of the present invention, there is provided a portable transceiver comprising the diversity receiver.

In accordance with one aspect of the present invention, there is provided a diversity receiving method comprising the steps of preparing a plurality of antennas, preparing receiving means for receiving radio waves via said antennas, disposing phase adjuster means for each said antenna and connecting said means thereto, adjusting by said phase adjuster means a phase angle of a radio wave received by each of the antennas to a value to increase gain of each of the antennas to which the phase adjuster means is not connected; and connecting, by switching means operative in response to a control signal (S1, S3) indicating a selected antenna having a best reception state to receive an external radio wave, the selected antenna to the receiving means, disconnecting the selected antenna from the phase adjuster means and non-selected antennas other than the selected antenna, and connecting the non-selected antennas to the phase adjuster means associated therewith.

In accordance with one aspect of the present invention, the diversity receiving method further includes the steps of terminating, by terminating means disposed for each of the antennas and connected to a final stage of the antenna, a transmission line; and adjusting, by terminating resistor reflection coefficient adjuster means disposed for each of the terminating means in a stage after the phase adjuster and before the terminating means, a reflection coefficient for an input signal fed to the terminating means to a larger value.

BRIEF DESCRIPTION OF THE DRAWINGS

The objects and features of the present invention will become more apparent from the consideration of the following detailed description taken in conjunction with the accompanying drawings in which:

FIG. 11 is an electric circuit diagram showing internal circuits of a phase adjuster circuit 5b in a third embodiment in accordance with the present invention.

DESCRIPTION OF THE PREFERRED EMBODIMENTS

Referring next to the accompanying drawings, description will be given in detail of an embodiment in accordance with the present invention.

First Embodiment

Figure 1:
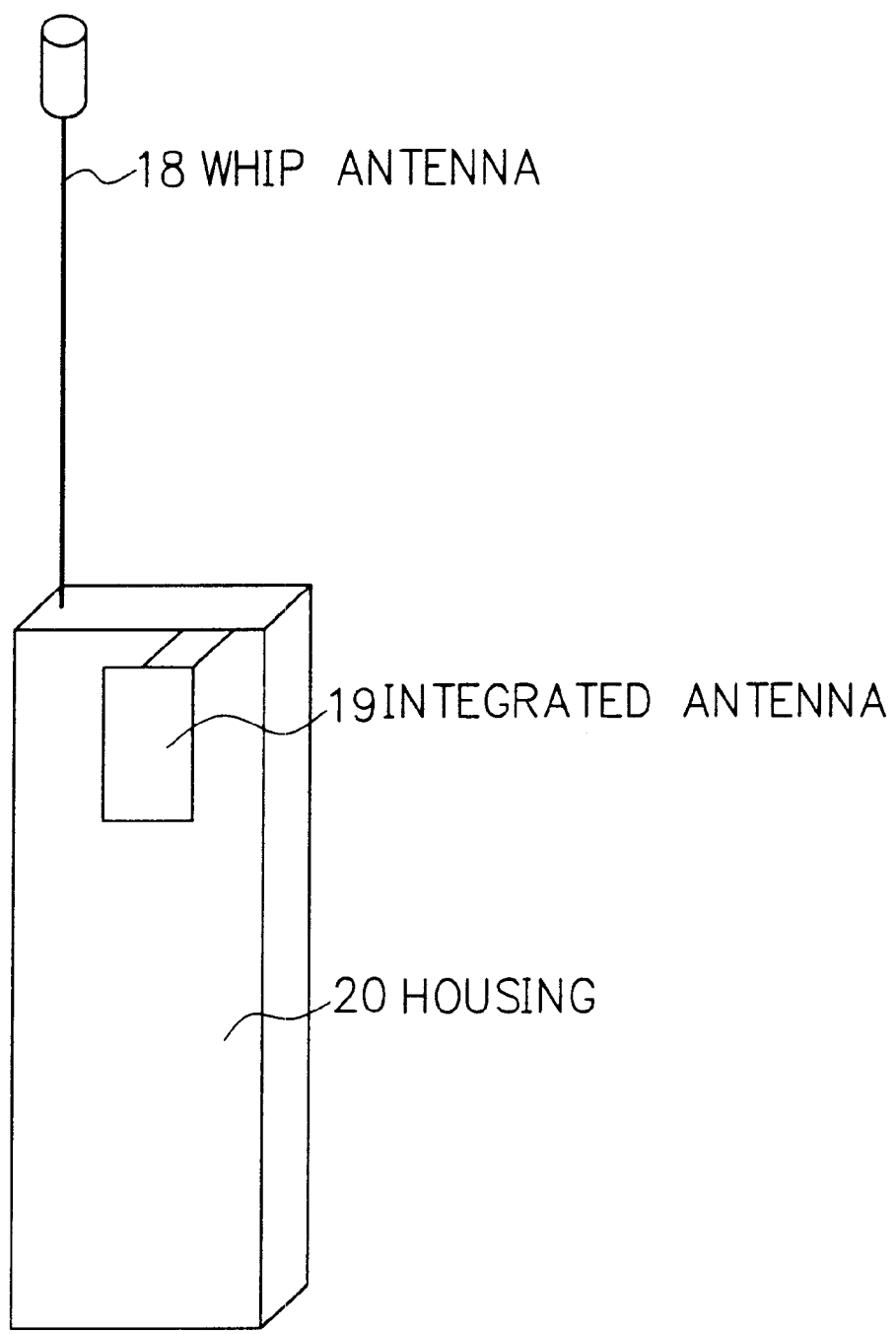
FIG. 1 is a perspective view showing constitution of a diversity receiver in the prior art.
Figure 2:
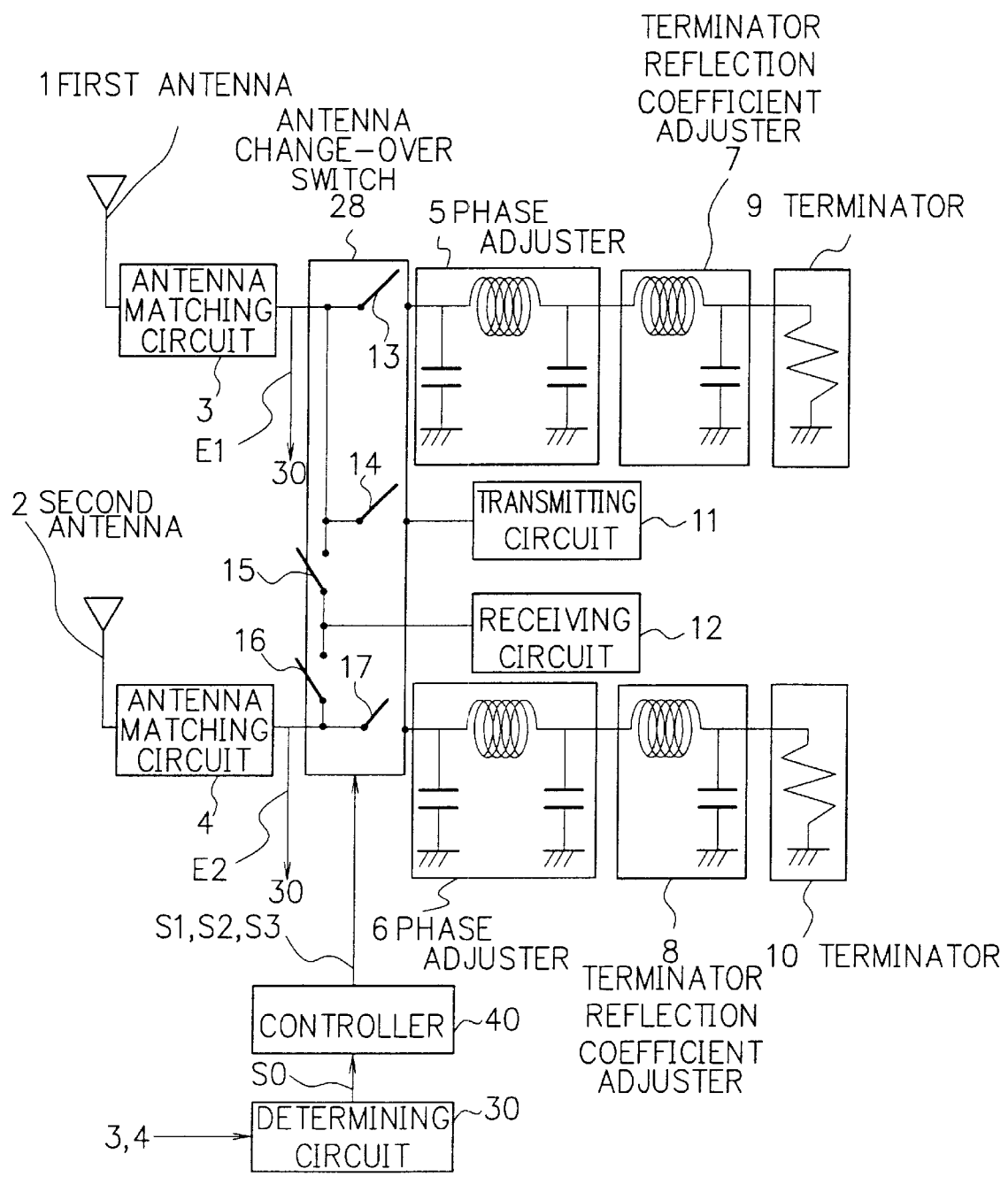
FIG. 2 is an electric circuit diagram showing a basic construction of a first embodiment in accordance with the present invention.

FIG. 2 shows in a circuit diagram a basic configuration of a first embodiment in accordance with the present invention. As shown in FIG. 2, in a diversity receiver of the first embodiment of the present invention, each of a first antenna 1 and a second antenna 2 for diversity receiving is connected by an antenna change-over switch 28 to a transmitting circuit 11 or a receiving circuit 12. The first and second antennas 1 and 2 are linked respectively with antenna matching circuits 3 and 4 each of which establishes matching between the associated antenna and a circuit of a subsequent stage thereof.

The first antenna 1 is used for transmission and reception. Hence it is selectively connected via switches 14 and 15 in the change-over switch to the transmission circuit 11 or the reception circuit 12.

The second antenna 2 is employed only for reception. Therefore the antenna 2 is not linked with the transmission circuit 11 and is connected via the switch 16 in the change-over switch 28 only to the reception circuit 12.

In a pager conducting diversity receiving, a field level received by the first antenna 1 and a field level received by the second antenna 2 are detected such that the antenna change-over switch 28 selects one of the antenna with a higher field level for reception.

In the embodiment, the antenna matching circuits 3 and 4 are connected to a determining circuit 30 to receive a field level E1 of the antenna 1 from the matching circuit 3 and a field level E2 of the antenna 2 from the matching circuit 4. The circuit 30 compares the field levels E1 and E2 with each other and produces a signal indicating one of the antennas 1 and 2 with a high field level and outputs the signal as a determination result S0 to a control circuit 40. According to the result S0, the controller 40 selects one of the antennas in a best reception state.

Figure 7:
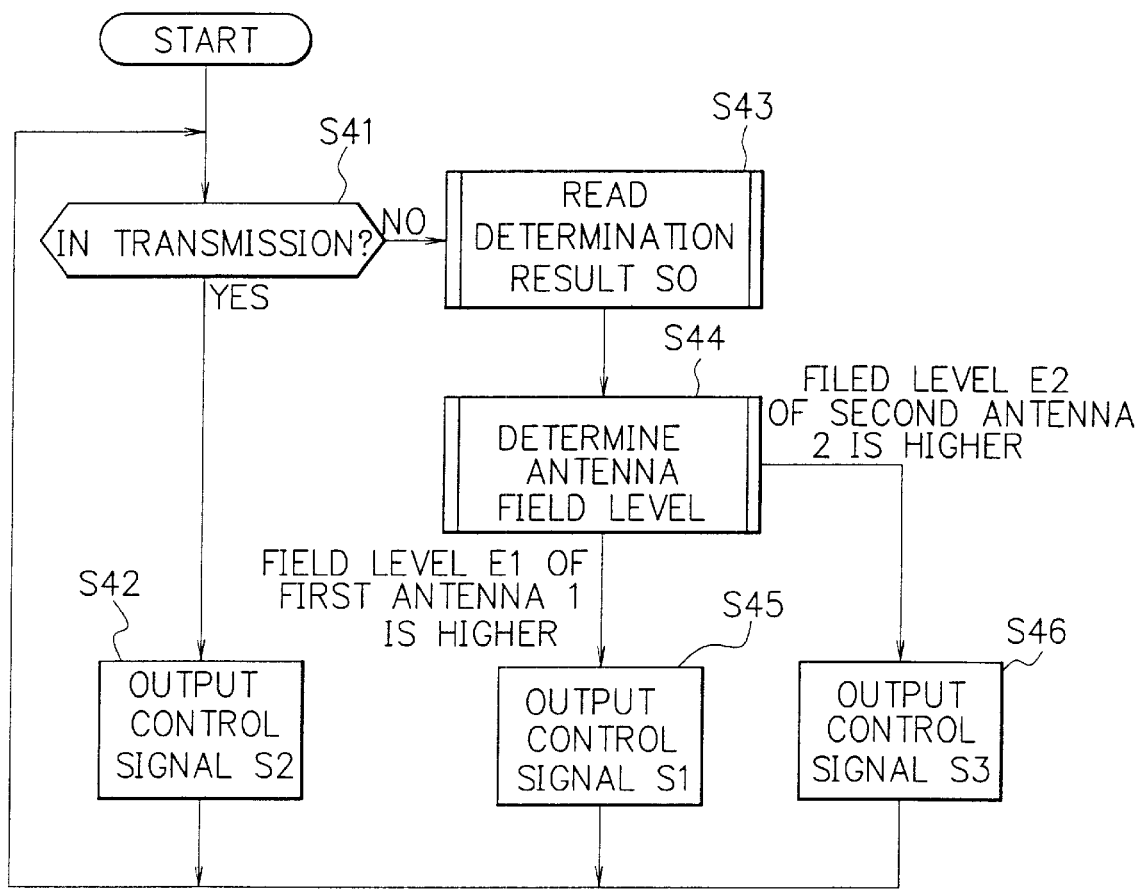
FIG. 7 is a flowchart showing operation of a controller circuit 40 of FIG. 2.

FIG. 7 shows, in a flowchart, operation of the controller 40 shown in FIG. 2. When the system is in a transmission state, the controller 40 supplies a control signal S2 to the antenna change-over switch 28. In response to the signal S2, switch 28 sets a switch 13 and the switch 15 to off (open), the switch 14 to on (closed), switch 16 to off, and a switch 17 to on (steps 41 and 42). When the system is in other than the transmission state, the controller 40 first reads the determination result S0 from the determining circuit 30 (step 43). If the field level E1 of the first antenna 1 is higher than the field level E2 of the second antenna 2, it is assumed to select the first antenna 1 and process goes to step 45. If the field level E2 of the second antenna 2 is higher than the field level E1 of the first antenna 1, it is assumed to select the second antenna 2 and process goes to step 46 (step 44). When the first antenna is selected in step 44, the controller 40 sends a control signal S1 to the antenna change-over switch 28 (step 45). The signal S1 indicates to set the switches 13 and 14 to off, the switch 15 to on, the switch 16 to off, and the switch 17 to on. When the second antenna 2 is selected in step 44, the controller 40 sends a control signal S3 to the switch 28 (step 46). The signal S3 indicates to set the switch 17 to off, the switch 16 to on, the switches 14 and 15 to off, and the switch 13 to on.

Figure 3:
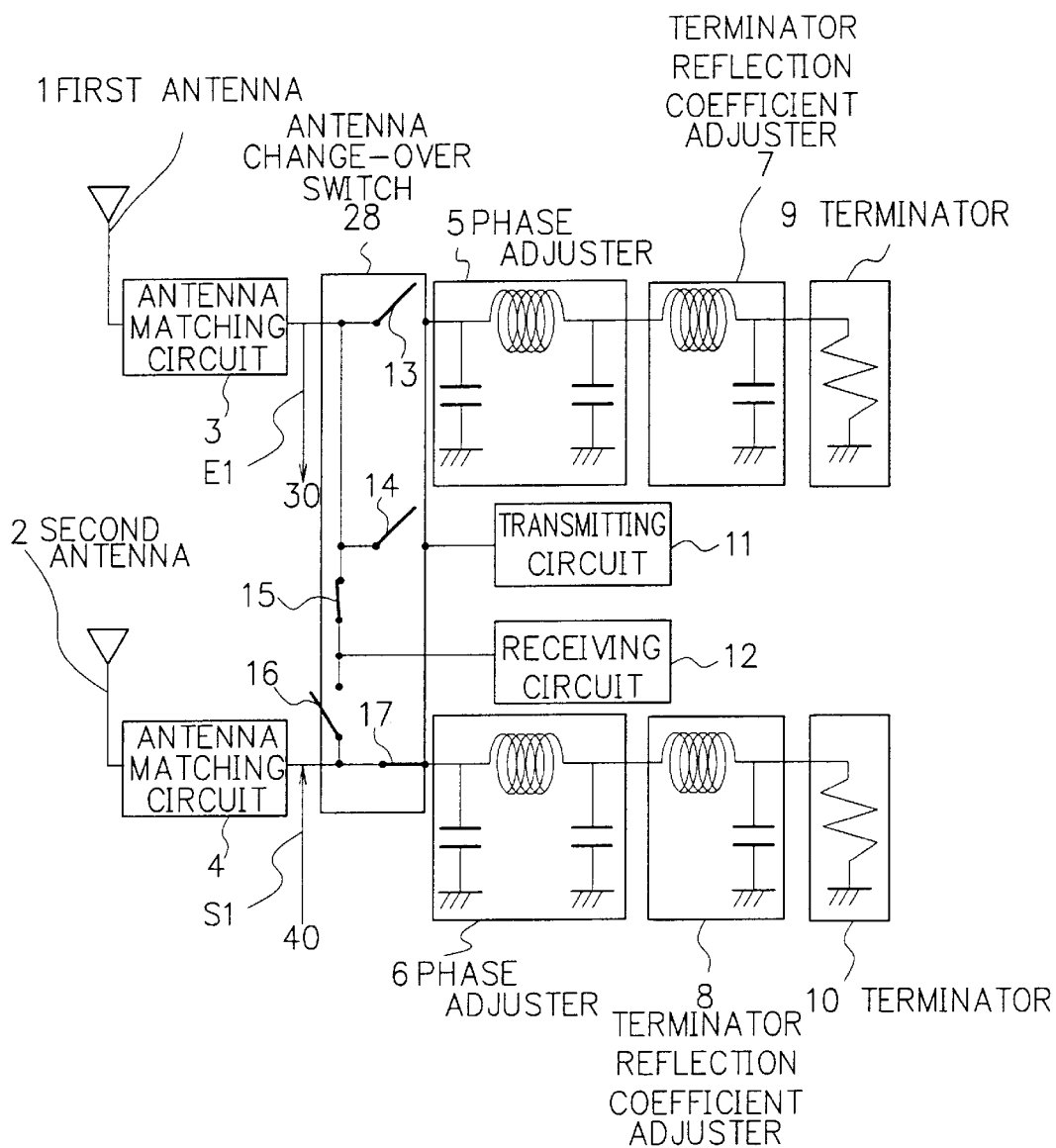
FIG. 3 is an electric circuit diagram showing connections in the first embodiment of FIG. 2 to receive radio wave via a first antenna 1.

FIG. 3 shows, in a circuit diagram, connections to receive radio waves by the first antenna.

When the first antenna 1 is selected, the first antenna 1 is coupled via the antenna matching circuit 3 and the antenna change-over circuit 28 with the receiving circuit 12. In this situation, the second antenna 2 is connected via the antenna change-over circuit 28 to a phase adjuster circuit 6, a terminator reflection coefficient adjuster circuit 8, and a terminator 10.

In response thereto, the switch 28 sets the switches 13 and 14 to off (open) and the switch 15 to on (closed). This connects the first antenna 1 to the receiving circuit 12. Simultaneously, the switches 16 and 17 go off and on, respectively. Resultantly, the second antenna 2 is connected to the phase adjuster circuit 6, the terminator reflection coefficient adjuster circuit 1, and the terminator 10.

Figure 4:
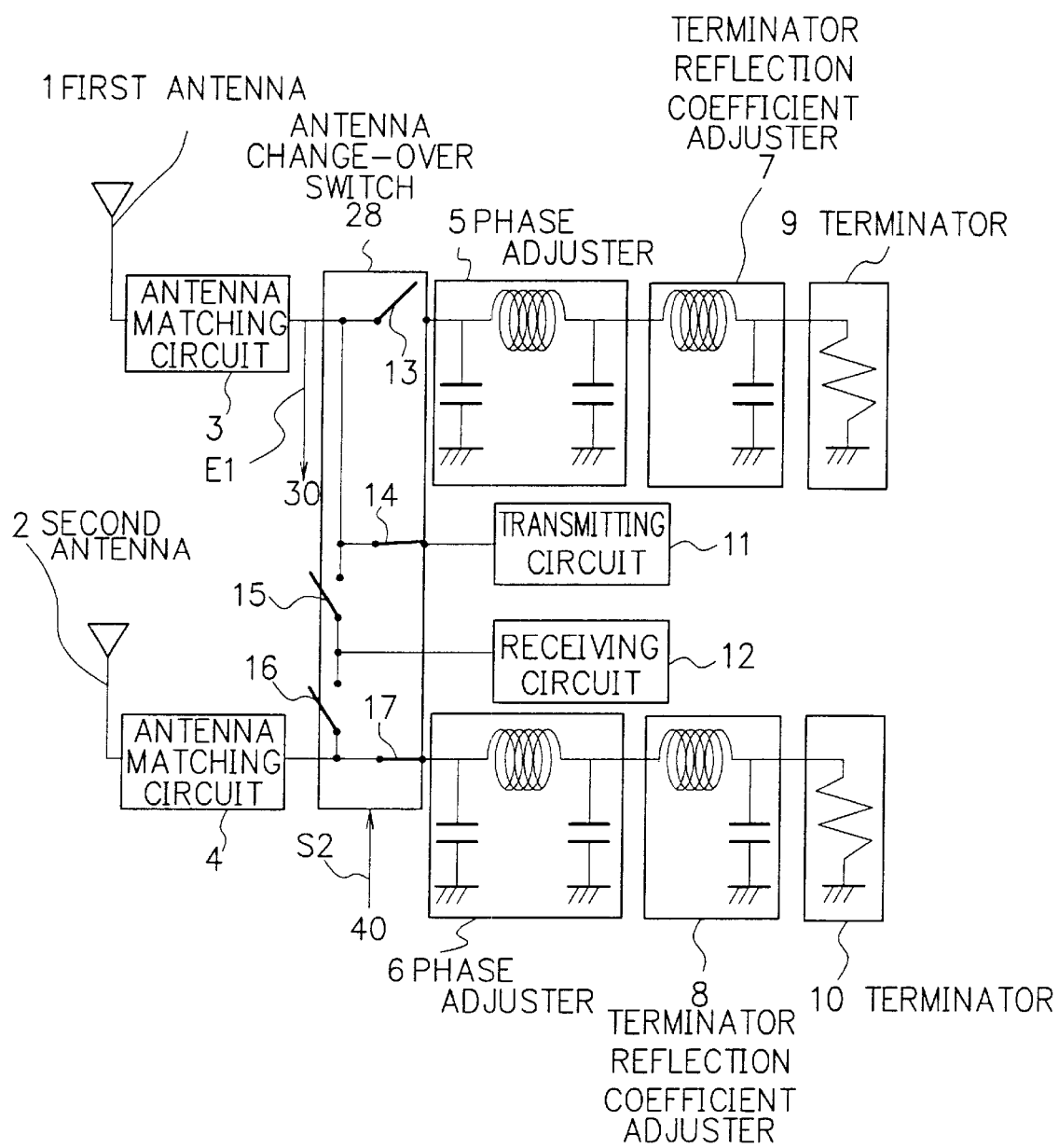
FIG. 4 is an electric circuit diagram showing connections in the first embodiment of FIG. 2 to transmit radio wave from a first antenna 1.

FIG. 4 shows, in a circuit diagram, a state of connection to transmit radio waves from the first antenna 1.

The first antenna 1 is linked via the antenna change-over switch 28 to the transmitting circuit 11. Also in this occasion, the second antenna 2 is connected via the switch 28 to the phase adjuster circuit 6, the terminator reflection coefficient adjuster circuit 8, and the terminator 10.

In the switch 28, the switches 13 and 15 go off and the switch 14 goes on. The first antenna 1 is therefore coupled (connected) with the transmitting circuit 11. At the same time, the switches 16 and 17 are set to off and on, respectively. Consequently, the second antenna 2 is linked with or connected with the phase adjuster circuit 6, the coefficient adjuster circuit 8, and the terminator 10.

Figure 5:
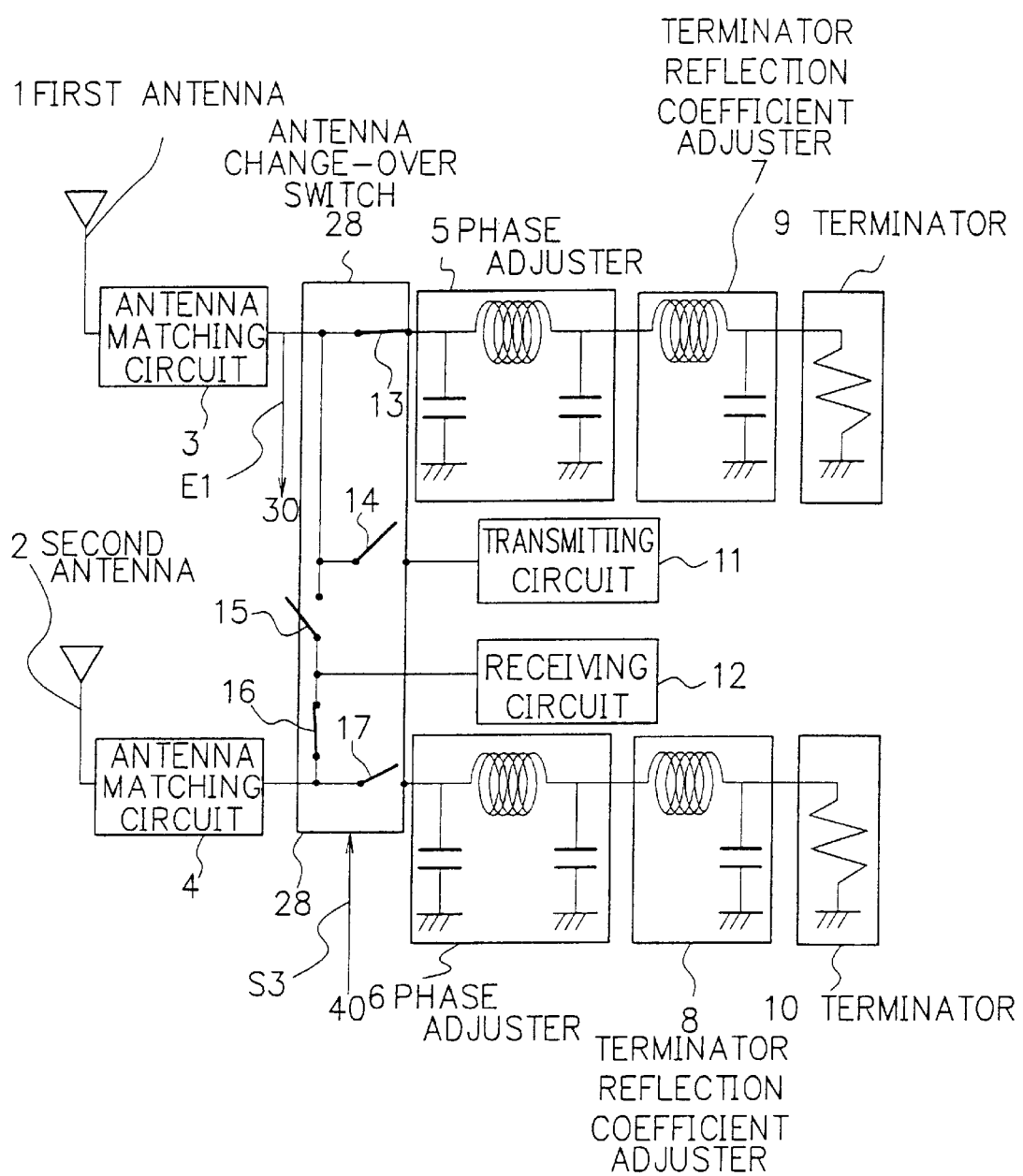
FIG. 5 is an electric circuit diagram showing connections in the first embodiment of FIG. 2 to receive radio wave via a second antenna 2.

FIG. 5 shows a connection state for reception by the second antenna 2 in an electric circuit diagram.

When the second antenna is selected, the second antenna 2 is linked via the antenna adjuster circuit 4 and the switch 28 with the receiving circuit 12. In this state, the first antenna 1 is coupled via the switch 28 to a phase adjuster circuit 5, a terminator reflection coefficient adjuster circuit 7, and a terminal resistor 9.

In the switch 28, the switch 17 turns off and the switch 16 turns on. The second antenna 2 is resultantly coupled (connected) with the receiving circuit 12. Simultaneously, the switches 14 and 15 are set to off and the switch 13 is set to on. This connects the first antenna to the phase adjuster circuit 5, the terminator reflection coefficient adjuster circuit 7, and the terminal resistor 9.

In the diversity receiver of the antenna change-over system, it is general that the selected antenna is connected via the antenna change-over switch to a radio section of the prior art, but the non-selected antenna is open (off) at a connecting point with the antenna change-over switch.

In this state, a signal received by the non-selected antenna is almost totally reflected at the connecting point in the open or off state of the antenna change-over switch with almost a total reflection coefficient.

Therefore, most of the input signal is reflected to the antenna and is emitted therefrom. The emitted signal is received by the antenna selected for reception. The received signal has a phase nearly opposite to that of a signal inherently received by the selected signal. Consequently, these signals cancel with each other and the signal to be received becomes weaker.

If impedance of the antenna change-over switch viewed from the non-selected antenna is almost equal to impedance for total transmission, the signal received by the non-selected antenna will be completely absorbed by the radio circuit side. Therefore, the characteristics of the selected antenna cannot be set to an optimal reception state.

To solve the problem in accordance with the present invention, the non-selected antenna is connected via the change-over switch to the phase adjuster circuit, the terminal resistor reflection coefficient adjuster circuit, and the terminator circuit. In this configuration, the phase of the signal directly received by the selected antenna is adjusted to be similar to that of the signal which is transmitted from the non-selected antenna and which is received by the selected antenna. The signal totally received by the selected signal enhances each other. This advantageously optimizes the characteristics of the selected antenna.

Figure 8:
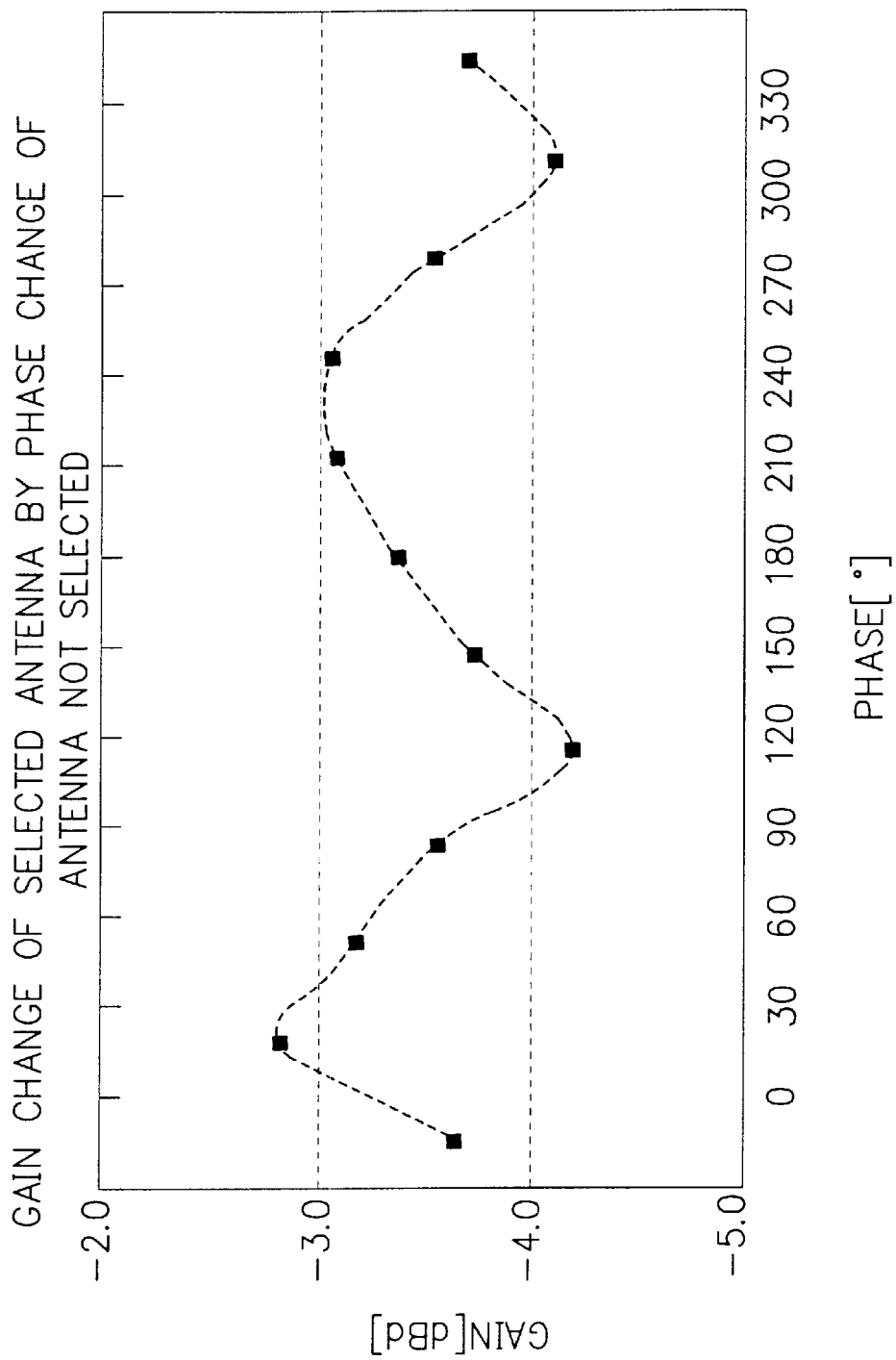
FIG. 8 is a graph showing an example of measurement results of change in antenna gain of a selected antenna when a phase of a non-selected antenna is varied.

FIG. 8 shows in a graph an example of measurement results of variation in antenna gain of the selected antenna when the phase of the signal of the non-selected antenna is changed.

Assume that the second antenna 2 is not selected. When the phase adjuster 6 connected to the second antenna 2 changes its phase difference 360°, there appear phase angles at which the gain of the antenna 1 selected in this situation is enhanced and weakened, respectively. This indicates that the gain of the selected antenna 1 varies according to the phase of the signal of the non-selected antenna 2. This tendency also applies to a situation in which the signals respectively of the antennas 1 and 2 have mutually different frequencies. That is, the phase adjuster 6 connected to the non-selected antenna 2 is set to a phase angle (near 30° or near 210° in the embodiment as shown in FIG. 8) to increase the gain of the selected antenna 1. In the designing stage, for each circuit to be designed, the designer measures gain values for phase angles as shown in FIG. 8 by a measuring apparatus to determine phase angles to obtain appropriate gain.

Figure 6:
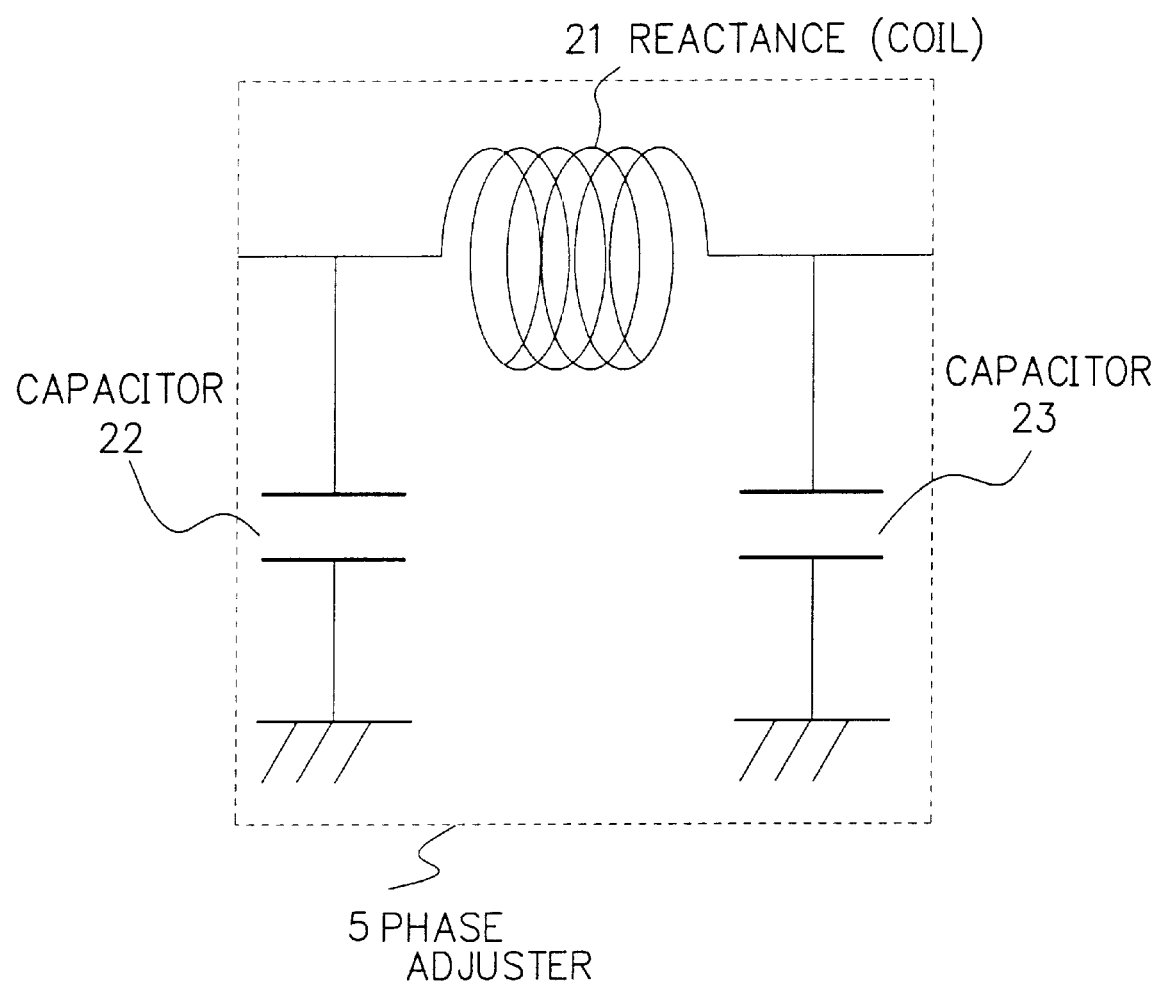
FIG. 6 is an electric circuit diagram showing circuit constitution of a phase adjuster circuit of FIG. 2.

FIG. 6 shows the phase adjuster 5 in the embodiment. The phase adjuster 5 includes a reactance (coil(s)) 21 and capacitors 22 and 23. By using a chip element device (e.g., chip antenna) in the phase adjuster 5 or by using a chip element device (e.g., chip antenna) as the phase adjuster 5, its size is minimized and the phase adjustment is facilitated. The construction and functions of the phase adjuster circuit 6 is similar to those of the phase adjuster 5. Therefore, in this connection, description of the adjuster circuit 6 will be avoided. In FIG. 6, the phase adjuster 5 is constituted a reactance which is connected in series between an input thereof and an output thereof, and a capacitor(s) which is connected in parallel respectively between an end of said reactance and ground and a capacitor connected between another end of said reactance and ground. However, when the phase adjuster 5 is arranged after a change-over switch relative to or viewed from an antenna to avoid influence of loss in the phase adjuster circuit and a terminator reflection coefficient adjuster circuit is disposed at a terminating point to obtain an optimal reflection characteristic, it is not restricted to FIG. 6. The reactance (coil(s)) and capacitor(s) of the phase adjuster 5 may be connected in parallel or in series, so far as the present invention has the above-mentioned characteristics, same as the terminator reflection coefficient adjuster 7.

In accordance with the present invention, the terminating point is not the antenna change-over switch but the terminator reflection coefficient adjuster circuit to optimize the terminator and the reflection coefficient thereof. As a result, there is obtained a terminating condition almost equal to that of the total reflection.

Figure 9:
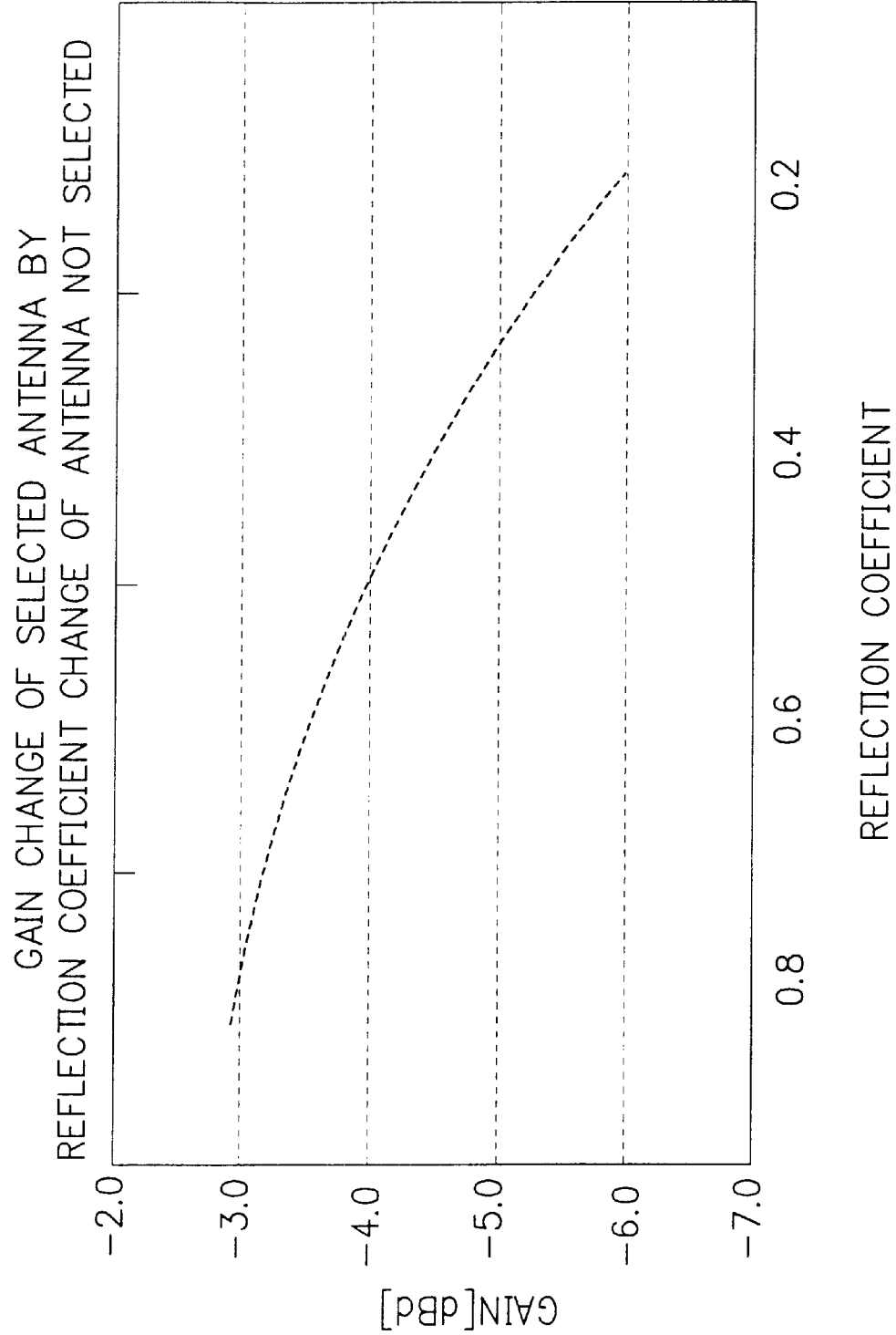
FIG. 9 is a graph showing an example of measurement results of change in antenna gain of a selected antenna when a reflection coefficient of a terminating point of a non-selected antenna is altered.

FIG. 9 shows in a graph an example of variation in antenna gain of the selected antenna (e.g., the antenna 1) when the reflection coefficient of the terminating point of the non-selected antenna (e.g., the antenna 2) is changed. It is assumed in this occasion that the phase of the non-selected antenna (e.g., the antenna 2) is adjusted to an optical value (near 30° or near 210° as shown in FIG. 8).

The graph indicates that when the reflection coefficient of the non-selected antenna (e.g., the antenna 2) decreases, the gain of the selected antenna (e.g., the antenna 1) minimizes even if the phase angle of the non-selected antenna is adjusted. This means that the terminator reflection coefficient adjuster 8 connected to the non-selected antenna conducts the adjustment to increase the reflection coefficient of the non-selected antenna (preferably, 0.8 in the embodiment). In the design phase, for each circuit to be designed, the designer measures gain corresponding to the reflection coefficient as shown in FIG. 9 using a measuring device or the like to determine the reflection coefficient for an appropriate gain. The reflection coefficient is basically determined by a reflection characteristic when the change-over switch is open or off.

Moreover, by connecting each phase adjuster circuit after the change-over switch relative to the associated antenna side, the phase adjuster circuit is directly linked with the antenna also when the antenna is in the selected state. This advantageously suppresses deterioration of antenna characteristics.

The configuration of the diversity receiver of the embodiment brings forth an advantage as below. By inserting the phase adjuster circuits 5 and 6, the terminator reflection coefficient adjuster 7 and 8, and the terminal resistors 9 and 10 after the antenna change-over switch 28 viewed from the antennas, the terminating condition of the non-selected antenna is optimized during the diversity receiving and the reception characteristic of the selected antenna is improved. In FIG. 2, the controller 40 and a determining circuit 30 may combination or separation, and these devices may be in the diversity receiver or out of the receiver.

Second Embodiment

Figure 10:
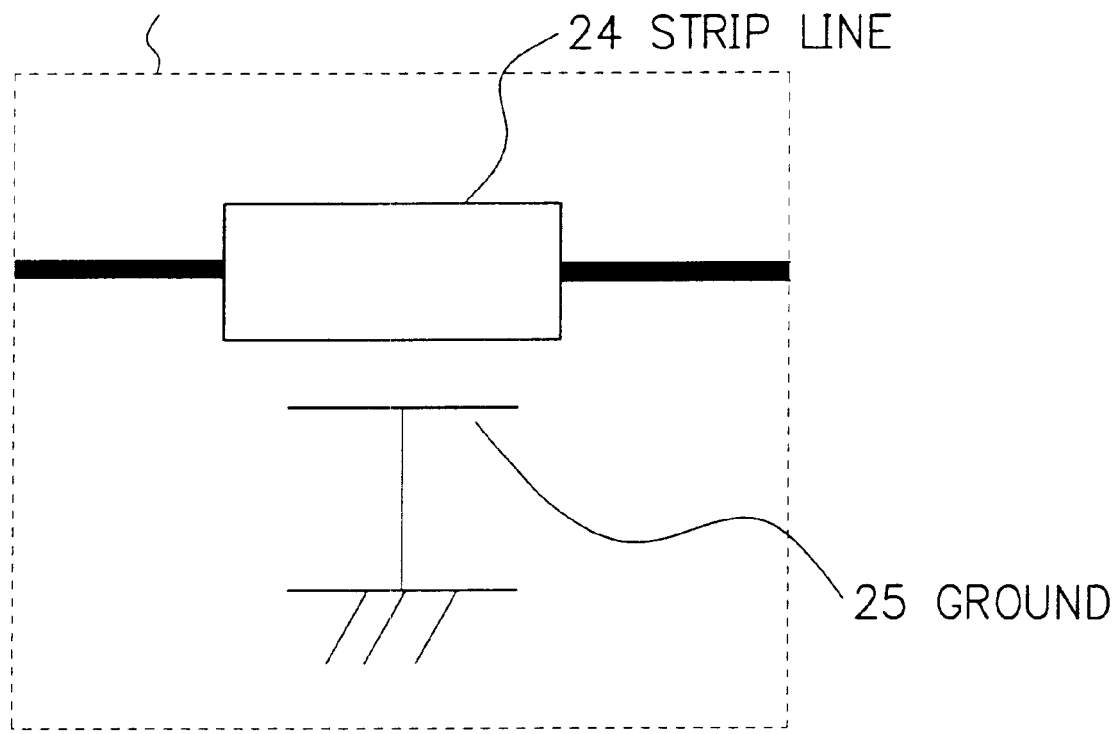
FIG. 10 is an electric circuit diagram showing internal circuits of a phase adjuster circuit 5a in a second embodiment in accordance with the present invention.

FIG. 10 shows a phase adjuster circuit 5a in a second embodiment in accordance with the present invention. The second embodiment is implemented by replacing the phase adjuster circuits 5 and 6 of the first embodiment shown in FIG. 2 with phase adjuster circuits 5a and 6a (not shown). The configuration and functions of the other constituent elements are almost the same as for those of the first embodiment.

In the second embodiment, the phase adjuster 5a includes a strip line 24 on a circuit substrate or board. Although an area to construct the strip line 24 is required on the circuit board, the reactance and capacitors can be dispensed with. This leads to reduction in the cost and weight. The construction and functions of the phase adjuster 6a are similar to those of the phase adjuster 5a and hence description there of will be avoided.

Third Embodiment

FIG. 11 demonstrates a phase adjuster circuit 5b in a third embodiment in accordance with the present invention. The third embodiment is constructed by substituting the phase adjuster circuits 5 and 6 of the first embodiment of FIG. 2 for phase adjuster circuits 5b and 6b, not shown. The structure and functions of the other constituent elements are almost equal to those of the first embodiment.

In the third embodiment, the phase adjuster 5b is implemented using a coaxial line 26 on a circuit substrate or board. In a radio system including a substrate or board on which the receiving circuit 12 and the transmitting circuit 11 are separated from the antenna change-over switch 28, the phase can be adjusted according to length of the coaxial line 26. Therefore, the phase adjustment can be carried out without influencing the layout and constants of parts of the circuit board.

The present invention is not restricted by the embodiments. The embodiments can be appropriately modified in accordance with the present invention.

The number, positions, and contour of the respective constituent elements are not restricted by the embodiment, but can be appropriately changed in respective applications of the present invention.

In the drawing, the same constituent components are assigned with the same reference numerals.

In the constitution of the present invention, there can be provided a highly efficient diversity receiver. In the diversity receiver, by installing the transmission line length adjuster circuit, i.e., the phase adjuster circuit after the change-over switch relative to the antenna, the influence of the loss can be prevented. Additionally, the terminator reflection coefficient adjuster circuit disposed at the terminating point, an optimal reflection characteristic can be obtained.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A diversity receiver, comprising:
   a plurality of antennas;
   a receiving circuit for receiving radio waves via said antennas;
   a plurality of phase adjuster circuits, each of said antennas connected to an associated one of said phase adjuster circuits for adjusting the phase angle of the radio waves received by the associated antenna to increase the gain of each antenna to which said associated phase adjuster circuit is not connected;
   a switching circuit continously responsive, during reception of the radio waves, to a control signal indicating one of said antennas having the best reception state to receive the radio waves, for connecting said indicated antenna to said receiving circuit, for disconnecting said indicated antenna from its associated phase adjuster circuit, and for connecting said non-indicated antennas to their respective associated phase adjuster circuits, wherein:
   said phase adjuster circuit is connected in a stage subsequent to said switching circuit viewed from said antennas.

2. The diversity receiver claimed in claim 1, further comprising a determining and controlling circuit responsive to the radio waves received by each of said antennas, for indicating the one of said antennas having the best reception state, and for producing the control signal indicating said indicated antenna.

3. A diversity receiver, comprising:

a plurality of antennas;

a receiving circuit for receiving radio waves via said antennas;

a plurality of phase adjuster circuits, each of said antennas connected to an associated one of said phase adjuster circuits for adjusting the phase angle of the radio waves received by the associated antenna to increase the gain of each antenna to which said associated phase adjuster circuit is not connected;

a switching circuit continuously responsive, during reception of the radio waves, to a control signal indicating one of said antennas having the best reception state to receive the radio waves, for connecting said indicated antenna to said receiving circuit, for disconnecting said indicated antenna from its associated phase adjuster circuit, and for connecting said non-indicated antennas to their respective associated phase adjuster circuits;

a plurality of terminating circuits, a respective terminating circuit of said plurality of terminating circuits being associated with each of said antennas for terminating a transmission line from the associated antenna; and a plurality of terminating resistor reflection coefficient adjuster circuits, each terminating resistor reflection coefficient adjuster circuit connecting an associated one of said phase adjuster circuits to an associated one of said terminating circuits, for adjusting a reflection coefficient of an input signal fed from said phase adjuster circuit, wherein:

each said phase adjuster circuit is connected in a stage subsequent to said switching circuit viewed from said antennas.

4. The diversity receiver claimed in claim 3, further comprising a determining and controlling circuit responsive to the radio waves received by each of said antennas, for indicating the one of said antennas having the best reception state, and for producing the control signal indicating said indicated antenna.

5. A diversity receiver, comprising:

a plurality of antennas;

a receiving circuit for receiving radio waves via said antennas;

a plurality of phase adjuster circuits, each of said antennas connected to an associated one of said phase adjuster circuits for adjusting the phase angle of the radio waves received by the associated antenna to increase the gain of each antenna to which said associated phase adjuster circuit is not connected;

a switching circuit continuously responsive, during reception of the radio waves, to a first control signal indicating one of said antennas having the best reception state to receive the radio waves, for connecting said indicated antenna to said receiving circuit, for disconnecting said indicated antenna from its associated phase adjuster circuit, and for connecting said non-indicated antennas to their respective associated phase adjuster circuits; and a transmitting circuit for transmitting a signal to said antennas, wherein:

said phase adjuster circuit is connected in a stage subsequent to said switching circuit viewed from said antennas, and said switching circuit is responsive to a second control signal, generated externally of said switching circuit and indicating a transmission state, to connect said transmitting circuit to antennas, from among said plurality of antennas, which are assigned for transmission.

6. The diversity receiver claimed in claim 5, further comprising a determining and controlling circuit responsive to the radio waves received by each of said antennas, for indicating the one of said antennas having the best reception state, and for producing the control signal indicating said indicated antenna.

7. A diversity receiver, comprising:

a plurality of antennas;

a receiving circuit for receiving radio waves via said antennas;

a plurality of phase adjuster circuits, each of said antennas connected to an associated one of said phase adjuster circuits for adjusting the phase angle of the radio waves received by the associated antenna to increase the gain of each antenna to which said associated phase adjuster circuit is not connected;

a switching circuit continuously responsive, during reception of the radio waves, to a first control signal indicating one of said antennas having the best reception state to receive the radio waves, for connecting said indicated antenna to said receiving circuit, for disconnecting said indicated antenna from its associated phase adjuster circuit, and for connecting said non-indicated antenna to their respective associated phase adjuster circuits;

a plurality of terminating circuits, a respective terminating circuit of said plurality of terminating circuits being associated with each of said antennas for terminating a transmission line from the associated antenna;

a plurality of terminating resistor reflection coefficient adjuster circuits, each terminating resistor reflection coefficient adjuster circuit connecting an associated one of said phase adjuster circuits to an associated one of said terminating circuits, for adjusting a reflection coefficient of an input signal fed thereto from said phase adjuster circuit; and a transmitting circuit for transmitting a signal to said antennas, wherein:

said phase adjuster circuit is connected in a stage subsequent to said switching circuit viewed from said antennas, said switching circuit is responsive to a second control signal, generated externally of said switching circuit and indicating a transmission state, to connect said transmitting circuit to antennas, from among said plurality of antennas, which are assigned for transmission.

8. The diversity receiver claimed in claim 7, further comprising a determining and controlling circuit responsive to the radio waves received by each of said antennas, for indicating the one of said antennas having the best reception state, and for producing the control signal indicating said indicated antenna.

9. A diversity receiver, comprising:

a plurality of antennas;

a receiving circuit for receiving radio waves via said antennas;

a plurality of phase adjuster circuits, each of said antennas connected to an associated one of said phase adjuster circuits for adjusting the phase angle of the radio waves received by the associated antenna to increase the gain of each antenna to which said associated phase adjuster circuit is not connected;

a switching circuit continuously responsive, during reception of the radio waves, to a control signal indicating one of said antennas having the best reception state to receive the radio waves, for connecting said indicated antenna to said receiving circuit, for disconnecting said indicated antenna from its associated phase adjuster circuit, and for connecting said non-indicated antennas to their respective associated phase adjuster circuits;

a plurality of terminating circuits, a respective terminating circuit of said plurality of terminating circuits being associated with each of said antennas for terminating a transmission line from the associated antenna; and a plurality of terminating resistor reflection coefficient adjuster circuits, each terminating resistor reflection coefficient adjuster circuit connecting an associated one of said phase adjuster circuits to an associated one of said terminating circuits, for adjusting a reflection coefficient of an input signal fed thereto from said phase adjuster circuit, wherein:

said phase adjuster circuit is connected in a stage subsequent to said switching circuit viewed from said antennas, and said terminating comprises a resistor.

10. The diversity receiver claimed in claim 9, further comprising a determining and controlling circuit responsive to the radio waves received by each of said antennas, for indicating the one of said antennas having the best reception state, and for producing the control signal indicating said indicated antenna.

11. A diversity receiver, comprising:

a plurality of antennas;

a receiving circuit for receiving radio waves via said antennas;

a plurality of phase adjuster circuits, each of said antennas connected to an associated one of said phase adjuster circuits for adjusting the phase angle of the radio waves received by associated antenna to increase the gain of each antenna to which said associated phase adjuster circuit is not connected;

a switching circuit continuously responsive, during reception of the radio waves, to a first control signal indicating one of said antennas having the best reception state to receive the radio waves, for connecting said indicated antenna to said receiving circuit, for disconnecting said indicated antenna from its associated phase adjuster circuit, and for connecting said non-indicated antennas to their respective associated phase adjuster circuits;

a plurality of terminating circuits, a respective terminating circuit of said plurality of terminating circuits being associated with each of said antennas for terminating a transmission line from the associated antenna;

a plurality of terminating resistor reflection coefficient adjuster circuits, each terminating resistor reflection coefficient adjuster circuit connecting an associated one of said phase adjuster circuits to an associated one of said terminating circuits, for adjusting a reflection coefficient of an input signal fed thereto from said phase adjuster circuit; and a transmitting circuit for transmitting a signal to said antennas, wherein:

said phase adjuster circuit is connected in a stage subsequent to said switching circuit viewed from said antennas, said switching circuit is responsive to a second control signal, generated externally of said switching circuit and indicating a transmission state, to connect said transmitting circuit to antennas, from among said plurality of antennas, which are assigned for transmission, and said terminating circuit comprises a resistor.

12. The diversity receiver claimed in claim 11, further comprising a determining and controlling circuit responsive to the radio waves received by each of said antennas, for indicating the one of said antennas having the best reception state, and for producing the control signal indicating said indicated antenna.

13. A diversity receiver, comprising:

a plurality of antennas;

a receiving circuit for receiving radio waves via said antennas;

a plurality of phase adjuster circuits, each of said antennas connected to an associated one of said phase adjuster circuits for adjusting the phase angle of the radio waves received by each said the associated antenna to increase the gain of each antenna to which said associated phase adjuster circuit is not connected;

a switching circuit continuously responsive, during reception of the radio waves, to a control signal indicating one of said antennas having the best reception state to receive the radio waves, for connecting said indicated antenna to said receiving circuit, for disconnecting said indicated antenna from its associated phase adjuster circuit, and for connecting said non-indicated antennas to their respective phase adjuster circuits;

a plurality of terminating circuits, a respective terminating circuit of said plurality of terminating circuits being associated with each of said antennas for terminating a transmission line from the associated antenna; and a plurality of terminating resistor reflection coefficient adjuster circuits, each terminating resistor reflection coefficient adjuster circuit connecting an associated one of said phase adjuster circuits to an associated one of said terminating circuits, for adjusting a reflection coefficient of an input signal fed thereto from said phase adjuster circuit, wherein:

said phase adjuster circuit is connected in a stage subsequent to said switching circuit viewed from said antennas, and said terminating resistor reflection adjuster circuit comprises a capacitor and a reactance.

14. The diversity receiver claimed in claim 13, further comprising a determining and controlling circuit responsive to the radio waves received by each of said antennas, for indicating the one of said antennas having the best reception state, and for producing the control signal indicating said indicated antenna.

15. A diversity receiver, comprising:

a plurality of antennas;

a receiving circuit for receiving radio waves via said antennas;

a plurality of phase adjuster circuits, each of said antennas connected to an associated one of said phase adjuster circuits for adjusting the phase angle of the radio waves received by the associated antenna to increase the gain of each antenna to which said associated phase adjuster circuit is not connected;

a switching circuit continuously responsive, during reception of the radio waves, to a first control signal indicating one of said antennas having the best reception state to receive the radio waves, for connecting said indicated antenna to said receiving circuit, for disconnecting said indicated antenna from its associated phase adjuster circuit, and for connecting said non-indicated antennas to their respective associated phase adjuster circuits;

a plurality of terminating circuits, a respective terminating circuit of said plurality of terminating circuits being associated with each of said antennas for terminating a transmission line from the associated antenna;

a plurality of terminating resistor reflection coefficient adjuster circuits, each terminating resistor reflection coefficient adjuster circuit connecting an associated one of said phase adjuster circuits to an associated one of said terminating circuits, for adjusting a reflection coefficient of an input signal fed thereto from said phase adjuster circuit; and a transmitting circuit for transmitting a signal to said antennas, wherein:

said phase adjuster circuit is connected in a stage subsequent to said switching circuit viewed from said antennas, said switching circuit is responsive to a second control signal, generated externally of said switching circuit and indicating a transmission state, to connect said transmitting circuit to antennas, from among said plurality of antennas, which are assigned for transmission, and said terminating resistor reflection adjuster comprises a capacitor and a reactance.

16. The diversity receiver claimed in claim 15, further comprising a determining and controlling circuit responsive to the radio waves received by each of said antennas, for indicating the one of said antennas having the best reception state, and for producing the control signal indicating said indicated antenna.

17. A diversity receiver, comprising:

a plurality of antennas;

a receiving circuit for receiving radio waves via said antennas;

a plurality of phase adjuster circuits, each of said antennas connected to an associated one of said phase adjuster circuits for adjusting the phase angle of the radio waves received by the associated antenna to increase the gain of each antenna to which said associated phase adjuster circuit is not connected;

a switching circuit continuously responsive, during reception of the radio waves, to a control signal indicating one of said antennas having the best reception state to receive the radio waves, for connecting said indicated antenna to said receiving circuit, for disconnecting said indicated antenna from its associated phase adjuster circuit, and for connecting said non-indicated antennas to their respective associated phase adjuster circuits;

a plurality of terminating circuits, a respective terminating circuit of said plurality of terminating circuits being associated with each of said antennas for terminating a transmission line from the associated antenna; and a plurality of terminating resistor reflection coefficient adjuster circuits, each terminating resistor reflection coefficient adjuster circuit connecting an associated one of said phase adjuster circuits to an associated one of said terminating circuits, for adjusting a reflection coefficient of an input signal fed thereto from said phase adjuster circuit, wherein:

said phase adjuster circuit is connected in a stage subsequent to said switching circuit viewed from said antennas, said terminating circuit comprises a resistor:

said terminating resistor reflection adjuster circuit comprises a capacitor and a reactance.

18. The diversity receiver claimed in claim 17, further comprising a determining and controlling circuit responsive to the radio waves received by each of said antennas, for indicating the one of said antennas having the best reception state, and for producing the control signal indicating said indicated antenna.

19. A diversity receiver, comprising:

a plurality of antennas;

a receiving circuit for receiving radio waves via said antennas;

a plurality of phase adjuster circuits, each of said antennas connected to an associated one of said phase adjuster circuits for adjusting the phase angle of the radio waves received by the associated antenna to increase the gain of each antenna to which said associated phase adjuster circuit is not connected; and a switching circuit continuously responsive, during reception of the radio waves, to a control signal indicating one of said antennas having the best reception state to receive the radio waves, for connecting said indicated antenna to said receiving circuit, for disconnecting said indicated antenna from its associated phase adjuster circuit, and for connecting said non-indicated antennas to their respective associated phase adjuster circuits, wherein:

said phase adjuster circuit is connected in a stage subsequent to said switching circuit viewed from said antennas; and said phase adjuster comprises capacitors and a reactance.

20. The diversity receiver claimed in claim 19, further comprising a determining and controlling circuit responsive to the radio waves received by each of said antennas, for indicating the one of said antennas having the best reception state, and for producing the control signal indicating said indicated antenna.

21. A diversity receiver, comprising:

a plurality of antennas;

a receiving circuit for receiving radio waves via said antennas;

a plurality of phase adjuster circuits, each of said antennas connected to an associated one of said phase adjuster circuits for adjusting the phase angle of the radio waves received by the associated antenna to increase the gain of each antenna to which said associated phase adjuster circuit is not connected;

a switching circuit continuously responsive, during reception of the radio waves, to a control signal indicating one of said antennas having the best reception state to receive the radio waves, for connecting said indicated antenna to said receiving circuit, for disconnecting said indicated antenna from its associated phase adjuster circuit, and for connecting said non-indicated antennas to their respective associated phase adjuster circuits;

a plurality of terminating circuits, a respective terminating circuit of said plurality of terminating circuits being associated with each of said antennas for terminating a transmission line from the associated antenna; and a plurality of terminating resistor reflection coefficient adjuster circuits, each terminating resistor reflection coefficient adjuster circuit connecting an associated one of said phase adjuster circuits to an associated one of said terminating circuits, for adjusting a reflection coefficient of an input signal fed thereto from said phase adjuster circuit, wherein:

said phase adjuster circuit is connected in a stage subsequent to said switching circuit viewed from said antennas, and said phase adjuster comprises capacitors and a reactance.

22. The diversity receiver claimed in claim 21, further comprising a determining and controlling circuit responsive to the radio waves received by each of said antennas, for indicating the one of said antennas having the best reception state, and for producing the control signal indicating said indicated antenna.

23. A diversity receiver, comprising:

a plurality of antennas;

a receiving circuit for receiving radio waves via said antennas;

a plurality of phase adjuster circuits, each of said antennas connected to an associated one of said phase adjuster circuits for adjusting the phase angle of the radio waves received by the associated antenna to increase the gain of each antenna to which said associated phase adjuster circuit is not connected;

a switching circuit continuously responsive, during reception of the radio waves, to a first control signal indicating one of said antennas having the best reception state to receive the radio waves, for connecting said indicated antenna to said receiving circuit, for disconnecting said indicated antenna from its associated phase adjuster circuit, and for connecting said non-indicated antennas to their respective associated phase adjuster circuits; and a transmitting circuit for transmitting a signal to said antennas, wherein:

said phase adjuster circuit is connected in a stage subsequent to said switching circuit viewed from said antennas, said phase adjuster circuit comprises capacitors and a reactance, and said switching circuit is responsive to a second control signal, generated externally of said switching circuit and indicating a transmission state, to connect said transmitting circuit to antennas, from among said plurality of antennas, which are assigned for transmission.

24. The diversity receiver claimed in claim 23, further comprising a determining and controlling circuit responsive to the radio waves received by each of said antennas, for indicating the one of said antennas having the best reception state, and for producing the control signal indicating said indicated antenna.

25. A diversity receiver, comprising:

a plurality of antennas;

a receiving circuit for receiving radio waves via said antennas;

a plurality of phase adjuster circuits, each of said antennas connected to an associated one of said phase adjuster circuits for adjusting the phase angle of the radio waves received by the associated antenna to increase the gain of each antenna to which said associated phase adjuster circuit is not connected;

a switching circuit continuously responsive, during reception of the radio waves, to a first control signal indicating one of said antennas having the best reception state to receive the radio waves, for connecting said indicated antenna to said receiving circuit, for disconnecting said indicated antenna from its associated phase adjuster circuit, and for connecting said non-indicated antennas to their respective associated phase adjuster circuits;

a plurality of terminating circuits, a respective terminating circuit of said plurality of terminating circuits being associated with each of said antennas for terminating a transmission line from the associated antenna;

a plurality of terminating resistor reflection coefficient adjuster circuits, each terminating resistor reflection coefficient adjuster circuit connecting an associated one of said phase adjuster circuits to an associated one of said terminating circuits, for adjusting a reflection coefficient of an input signal fed thereto from said phase adjuster circuit; and a transmitting circuit for transmitting a signal to said antennas, wherein:

said phase adjuster circuit is connected in a stage subsequent to said switching circuit viewed from said antennas, said phase adjuster comprises capacitors and a reactance, and said switching circuit is responsive to a second control signal, generated externally of said switching circuit and indicating a transmission state, to connect said transmitting circuit to antennas, from among said plurality of antennas, which are assigned for transmission.

26. The diversity receiver claimed in claim 25, further comprising a determining and controlling circuit responsive to the radio waves received by each of said antennas, for indicating the one of said antennas having the best reception state, and for producing the control signal indicating said indicated antenna.

27. A diversity receiver, comprising:

a plurality of antennas;

a receiving circuit for receiving radio waves via said antennas;

a plurality of phase adjuster circuits, each of said antennas connected to an associated one of said phase adjuster circuits for adjusting the phase angle of the radio waves received by the associated antenna to increase the gain of each antenna to which said associated phase adjuster circuit is not connected;

a switching circuit continuously responsive, during reception of the radio waves, to a control signal indicating one of said antennas having the best reception state to receive the radio waves, for connecting said indicated antenna to said receiving circuit, for disconnecting said indicated antenna from its associated phase adjuster circuit, and for connecting said non-indicated antennas to their respective associated phase adjuster circuits;

a plurality of terminating circuits, a respective terminating circuit of said plurality of terminating circuits being associated with each of said antennas for terminating a transmission line from the associated antenna; and a plurality of terminating resistor reflection coefficient adjuster circuits, each terminating resistor reflection coefficient adjuster circuit connecting an associated one of said phase adjuster circuits to an associated one of said terminating circuits, for adjusting a reflection coefficient of an input signal fed thereto from said phase adjuster circuit, wherein:

said phase adjuster circuit is connected in a stage subsequent to said switching circuit viewed from said antennas, said phase adjuster comprises capacitors and a reactance, and said terminating means comprises a resistor.

28. The diversity receiver claimed in claim 27, further comprising a determining and controlling circuit responsive to the radio waves received by each of said antennas, for indicating the one of said antennas having the best reception state, and for producing the control signal indicating said indicated antenna.

29. A diversity receiver, comprising:

a plurality of antennas;

a receiving circuit for receiving radio waves via said antennas;

a plurality of phase adjuster circuits, each of said antennas connected to an associated one of said phase adjuster circuits for adjusting the phase angle of the radio waves received by the associated antenna to increase the gain of each antenna to which said associated phase adjuster circuit is not connected;

a switching circuit continuously responsive, during reception of the radio waves, to a first control signal indicating one of said antennas having the best reception state to receive the radio waves, for connecting said indicated antenna to said receiving circuit, for disconnecting said indicated antenna from its associated phase adjuster circuit, and for connecting said non-indicated antennas to their respective associated phase adjuster circuits;

a plurality of terminating circuits, a respective terminating circuit of said plurality of terminating circuits being associated with each of said antennas for terminating a transmission line from the associated antenna;

a plurality of terminating resistor reflection coefficient adjuster circuits, each terminating resistor reflection coefficient adjuster circuit connecting an associated one of said terminating circuits, for adjusting a reflection coefficient of an input signal fed thereto from said phase adjuster circuit; and a transmitting circuit for transmitting a signal to said antennas, wherein:

said phase adjuster circuit is connected in a stage subsequent to said switching circuit viewed from said antennas, said phase adjuster comprises capacitors and a reactance, said switching circuit is responsive to a second control signal, generated externally of said switching circuit and indicating a transmission state, to connect said transmitting circuit to antennas, from among said plurality of antennas, which are assigned for transmission, and said terminating means comprises a resistor.

30. The diversity receiver claimed in claim 29, further comprising a determining and controlling circuit responsive to the radio waves received by each of said antennas, for indicating the one of said antennas having the best reception state, and for producing the control signal indicating said indicated antenna.

31. A diversity receiver, comprising:

a plurality of antennas;

a receiving circuit for receiving radio waves via said antennas;

a plurality of phase adjuster circuits, each of said antennas connected to an associated one of said phase adjuster circuits for adjusting the phase angle of the radio waves received by the associated antenna to increase the gain of each antenna to which said associated phase adjuster circuit is not connected;

a switching circuit continuously responsive, during reception of the radio waves, to a control signal indicating one of said antennas having the best reception state to receive the radio waves, for connecting said indicated antenna to said receiving circuit, for disconnecting said indicated antenna from its associated phase adjuster circuit, and for connecting said non-indicated antennas to their respective associated phase adjuster circuits;

a plurality of terminating circuits, a respective terminating circuit of said plurality of terminating circuits being associated with each of said antennas for terminating a transmission line from the associated antenna; and a plurality of terminating resistor reflection coefficient adjuster circuits, each terminating resistor reflection coefficient adjuster circuit connecting an associated one of said phase adjuster circuits to an associated one of said terminating circuits, for adjusting a reflection coefficient of an input signal fed thereto from said phase adjuster circuit, wherein:

said phase adjuster circuit is connected in a stage subsequent to said switching circuit viewed from said antennas, and said phase adjuster comprises capacitors and a reactance, and each of said terminating resistor reflection coefficient adjuster circuits comprises a capacitor and a reactance.

32. The diversity receiver claimed in claim 31, further comprising a determining and controlling circuit responsive to the radio waves received by each of said antennas, for indicating the one of said antennas having the best reception state, and for producing the control signal indicating said indicated antenna.

33. A diversity receiver, comprising:

a plurality of antennas;

a receiving circuit for receiving radio waves via said antennas;

a plurality of phase adjuster circuits, each of said antennas connected to an associated one of said phase adjuster circuits for adjusting the phase angle of the radio waves received by the associated antenna to increase the gain of each antenna to which said associated phase adjuster circuit is not connected;

a switching circuit continuously responsive, during reception of the radio waves, to a first control signal indicating one of said antennas having the best reception state to receive the radio waves, for connecting said indicated antenna to said receiving circuit, for disconnecting said indicated antenna from its associated phase adjuster circuit, and for connecting said non-indicated antennas to their respective associated phase adjuster circuits;

a plurality of terminating circuits, a respective terminating circuit of said plurality of terminating circuits being associated with each of said antennas for terminating a transmission line from the associated antenna;

a plurality of terminating resistor reflection coefficient adjuster circuits, each terminating resistor reflection coefficient adjuster circuit connecting an associated one of said phase adjuster circuits to an associated one of said terminating circuits, for adjusting a reflection coefficient of an input signal fed thereto from said phase adjuster circuit; and a transmitting circuit for transmitting a signal to said antennas, wherein:
said phase adjuster circuit is connected in a stage subsequent to said switching circuit viewed from said antennas,
said phase adjuster comprises capacitors and a reactance,
said switching circuit is responsive to a second control signal, generated externally of said switching circuit and indicating a transmission state, to connect said transmitting circuit to antennas, from among said plurality of antennas, which are assigned for transmission, and
each of said terminating resistor reflection coefficient adjuster circuits comprises a capacitor and a reactance.

34. The diversity receiver claimed in claim 33, further comprising a determining and controlling circuit responsive to the radio waves received by each of said antennas, for indicating the one of said antennas having the best reception state, and for producing the control signal indicating said indicated antenna.

35. A diversity receiver, comprising:
a plurality of antennas;
a receiving circuit for receiving radio waves via said antennas;
a plurality of phase adjuster circuits, each of said antennas connected to an associated one of said phase adjuster circuits for adjusting the phase angle of the radio waves received by the associated antenna to increase the gain of each antenna to which said associated phase adjuster circuit is not connected;
a switching circuit continuously responsive, during reception of the radio waves, to a control signal indicating one of said antennas having the best reception state to receive the radio waves, for connecting said indicated antenna to said receiving circuit, for disconnecting said indicated antenna from its associated phase adjuster circuit, and for connecting said non-indicated antennas to their respective associated phase adjuster circuits;
a plurality of terminating circuits, a respective terminating circuit of said plurality of terminating circuits being associated with each of said antennas for terminating a transmission line from the associated antenna; and
a plurality of terminating resistor reflection coefficient adjuster circuits, each terminating resistor reflection coefficient adjuster circuit connecting an associated one of said phase adjuster circuits to an associated one of said terminating circuits, for adjusting a reflection coefficient of an input signal fed thereto from said phase adjuster circuit, wherein:
said phase adjuster circuit is connected in a stage subsequent to said switching circuit viewed from said antennas,
said phase adjuster comprises capacitors and a
said terminating means comprises a resistor, and
each of said terminating resistor coefficient adjuster circuits comprises a capacitor and a reactance.

36. The diversity receiver claimed in claim 35, further comprising a determining and controlling circuit responsive to the radio waves received by each of said antennas, for indicating the one of said antennas having the best reception state, and for producing the control signal indicating said indicated antenna.

37. A diversity receiver, comprising:
a plurality of antennas;
a receiving circuit for receiving radio waves via said antennas;
a plurality of phase adjuster circuits, each of said antennas connected to an associated one of said phase adjuster circuits for adjusting the phase angle of the radio waves received by the associated antenna to increase the gain of each antenna to which said associated phase adjuster circuit is not connected; and
a switching circuit continuously responsive, during reception of the radio waves, to a control signal indicating one of said antennas having the best reception state to receive the radio waves, for connecting said indicated antenna to said receiving circuit, for disconnecting said indicated antenna from its associated phase adjuster circuit, and for connecting said non-indicated antennas to their respective associated phase adjuster circuits, wherein:
said phase adjuster circuit is connected in a stage subsequent to said switching circuit viewed from said antenna, and
said phase adjuster comprises a strip line or a coaxial line.

38. The diversity receiver claimed in claim 37, further comprising a determining and controlling circuit responsive to the radio waves received by each of said antennas, for indicating the one of said antennas having the best reception state, and for producing the control signal indicating said indicated antenna.

39. A diversity receiver, comprising:
a plurality of antennas;
a receiving circuit for receiving radio waves via said antennas;
a plurality of phase adjuster circuits, each of said antennas connected to an associated one of said phase adjuster circuits for adjusting the phase angle of the radio waves received by the associated antenna to increase the gain of each antenna to which said associated phase adjuster circuit is not connected;
a switching circuit continuously responsive, during reception of the radio waves, to a control signal indicating one of said antennas having the best reception state to receive the radio waves, for connecting said indicated antenna to said receiving circuit, for disconnecting said indicated antenna from its associated phase adjuster circuit, and for connecting said non-indicated antennas to their respective associated phase adjuster circuits;
a plurality of terminating circuits, a respective terminating circuit of said plurality of terminating circuits being associated with each of said antennas for terminating a transmission line from the associated antenna; and
a plurality of terminating resistor reflection coefficient adjuster circuits, each terminating resistor reflection coefficient adjuster circuit connecting an associated one of said phase adjuster circuits to an associated one of said terminating circuits, for adjusting a reflection coefficient of an input signal fed thereto from said phase adjuster circuit, wherein:
said phase adjuster circuit is connected in a stage subsequent to said switching circuit viewed from said antennas, and
said phase adjuster comprises a strip line or a coaxial line.

40. The diversity receiver claimed in claim 39, further comprising a determining and controlling circuit responsive to the radio waves received by each of said antennas, for indicating the one of said antennas having the best reception state, and for producing the control signal indicating said indicated antenna.

41. A diversity receiver, comprising:

a plurality of antennas;

a receiving circuit for receiving radio waves via said antennas;

a plurality of phase adjuster circuits, each of said antennas connected to an associated one of said phase adjuster circuits for adjusting the phase angle of the radio waves received by the associated antenna to increase the gain of each antenna to which said associated phase adjuster circuit is not connected;

a switching circuit continuously responsive, during reception of the radio waves, to a first control signal indicating one of said antennas having the best reception state to receive the radio waves, for connecting said indicated antenna to said receiving circuit, for disconnecting said indicated antenna from its associated phase adjuster circuit, and for connecting said non-indicated antennas to their respective associated phase adjuster circuits; and a transmitting circuit for transmitting a signal to said antennas, wherein:

said phase adjuster circuit is connected in a stage subsequent to said switching circuit viewed from said antennas, said phase adjuster comprises a strip line or a coaxial line, said switching circuit is responsive to a second control signal, generated externally of said switching circuit and inputted to indicate a transmission state, to connect said transmitting circuit only to antennas from among said plurality of antennas which are assigned for transmission.

42. The diversity receiver claimed in claim 41, further comprising a determining and controlling circuit responsive to the radio waves received by each of said antennas, for indicating the one of said antennas having the best reception state, and for producing the control signal indicating said indicated antenna.

43. A diversity receiver, comprising:

a plurality of antennas;

a receiving circuit for receiving radio waves via said antennas;

a plurality of phase adjuster circuits, each of said antennas connected to an associated one of said phase adjuster circuits for adjusting the phase angle of the radio waves received by the associated antenna to increase the gain of each antenna to which said associated phase adjuster circuit is not connected;

a switching circuit continuously responsive, during reception of the radio waves, to a control signal indicating one of said antennas having the best reception state to receive the radio waves, for connecting said indicated antenna to said receiving circuit, for disconnecting said indicated antenna from its associated phase adjuster circuit, and for connecting said non-indicated antennas to their respective associated phase adjuster circuits;

a plurality of terminating circuits, a respective terminating circuit of said plurality of terminating circuits being associated with each of said antennas for terminating a transmission line from the associated antenna;

a plurality of terminating resistor reflection coefficient adjuster circuits, each terminating resistor reflection coefficient adjuster circuit connecting an associated one of said phase adjuster circuits to an associated one of said terminating circuits, for adjusting a reflection coefficient of an input signal fed thereto from said phase adjuster circuit; and a transmitting circuit for transmitting a signal to said antennas, wherein:

said phase adjuster circuit is connected in a stage subsequent to said switching circuit viewed from said antennas, said phase adjuster comprises a strip line or a coaxial line, and said switching circuit is responsive to a second control signal, generated externally of said switching circuit and indicating a transmission state, to connect said transmitting circuit to antennas, from among said plurality of antennas, which are assigned for transmission.

44. The diversity receiver claimed in claim 43, further comprising a determining and controlling circuit responsive to the radio waves received by each of said antennas, for indicating the one of said antennas having the best reception state, and for producing the control signal indicating said indicated antenna.

45. A diversity receiver, comprising:

a plurality of antennas;

a receiving circuit for receiving radio waves via said antennas;

a plurality of phase adjuster circuits, each of said antennas connected to an associated one of said phase adjuster circuits for adjusting the phase angle of the radio waves received by the associated antenna to increase the gain of each antenna to which said associated phase adjuster circuit is not connected;

a switching circuit continuously responsive, during reception of the radio waves, to a control signal indicating one of said antennas having the best reception state to receive the radio waves, for connecting said indicated antenna to said receiving circuit, for disconnecting said indicated antenna from its associated phase adjuster circuit, and for connecting said non-indicated antennas to their respective associated phase adjuster circuits;

a plurality of terminating circuits, a respective terminating circuit of said plurality of terminating circuits being associated with each of said antennas for terminating a transmission line from the associated antenna; and a plurality of terminating resistor reflection coefficient adjuster circuits, each terminating resistor reflection coefficient adjuster circuit connecting an associated one of said phase adjuster circuits to an associated one of said terminating circuits, for adjusting a reflection coefficient of an input signal fed thereto from said phase adjuster circuit, wherein:

said phase adjuster circuit is connected in a stage subsequent to said switching circuit viewed from said antennas, said phase adjuster comprises a strip line or a coaxial line, and said terminating circuit comprises a resistor.

46. The diversity receiver claimed in claim 45, further comprising a determining and controlling circuit responsive to the radio waves received by each of said antennas, for indicating the one of said antennas having the best reception state, and for producing the control signal indicating said indicated antenna.

47. A diversity receiver, comprising:

a plurality of antennas;

a receiving circuit for receiving radio waves via said antennas;

a plurality of phase adjuster circuits, each of said antennas connected to an associated one of said phase adjuster circuits for adjusting the phase angle of the radio waves received by the associated antenna to increase the gain of each antenna to which said associated phase adjuster circuit is not connected;

a switching circuit continuously responsive, during reception of the radio waves, to a first control signal indicating one of said antennas having the best reception state to receive the radio waves, for connecting said indicated antenna to said receiving circuit, for disconnecting said indicated antenna from its associated phase adjuster circuit, and for connecting said non-indicated antennas to their respective associated phase adjuster circuits;

a plurality of terminating circuits, a respective terminating circuit of said plurality of terminating circuits being associated with each of said antennas for terminating a transmission line from the associated antenna;

a plurality of terminating resistor reflection coefficient adjuster circuits, each terminating resistor reflection coefficient adjuster circuit connecting an associated one of said phase adjuster circuits to an associated one of said terminating circuits, for adjusting a reflection coefficient of an input signal fed thereto from said phase adjuster circuit; and a transmitting circuit for transmitting a signal to said antennas, wherein:
said phase adjuster circuit is connected in a stage subsequent to said switching circuit viewed from said antennas,
said phase adjuster comprises a strip line or a coaxial line,
said switching circuit is responsive to a second control signal, generated externally of said switching circuit and indicating a transmission state, to connect said transmitting circuit to antennas, from among said plurality of antennas, which are assigned for transmission, and
said terminating circuit comprises a resistor.

48. The diversity receiver claimed in claim 47, further comprising a determining and controlling circuit responsive to the radio waves received by each of said antennas, for indicating the one of said antennas having the best reception state, and for producing the control signal indicating said indicated antenna.

49. A diversity receiver, comprising:
a plurality of antennas;
a receiving circuit for receiving radio waves via said antennas;
a plurality of phase adjuster circuits, each of said antennas connected to an associated one of said phase adjuster circuits for adjusting the phase angle of the radio waves received by the associated antenna to increase the gain of each antenna to which said associated phase adjuster circuit is not connected;
a switching circuit continuously responsive, during reception of the radio waves, to a control signal indicating one of said antennas having the best reception state to receive the radio waves, for connecting said indicated antenna to said receiving circuit, for disconnecting said indicated antenna from its associated phase adjuster circuit, and for connecting said non-indicated antennas to their respective associated phase adjuster circuits;

a plurality of terminating circuits, a respective terminating circuit of said plurality of terminating circuits being associated with each of said antennas for terminating a transmission line from the associated antenna;
a plurality of terminating resistor reflection coefficient adjuster circuits, each terminating resistor reflection coefficient adjuster circuit connecting an associated one of said phase adjuster circuits to an associated one of said terminating circuits, for adjusting a reflection coefficient of an input signal fed thereto from said phase adjuster circuit, wherein:
said phase adjuster circuit is connected in a stage subsequent to said switching circuit viewed from said antennas,
said phase adjuster comprises a strip line or a coaxial line, and
said terminating resistor reflection adjuster circuit comprises a capacitor and a reactance.

50. The diversity receiver claimed in claim 49, further comprising a determining and controlling circuit responsive to the radio waves received by each of said antennas, for indicating the one of said antennas having the best reception state, and for producing the control signal indicating said indicated antenna.

51. A diversity receiver, comprising:
a plurality of antennas;
a receiving circuit for receiving radio waves via said antennas;
a plurality of phase adjuster circuits, each of said antennas connected to an associated one of said phase adjuster circuits for adjusting the phase angle of the radio waves received by the associated antenna to increase the gain of each antenna to which said associated phase adjuster circuit is not connected;
a switching circuit continuously responsive, during reception of the radio waves, to a first control signal indicating one of said antennas having the best reception state to receive the radio waves, for connecting said indicated antenna to said receiving circuit, for disconnecting said indicated antenna from its associated phase adjuster circuit, and for connecting said non-indicated antennas to their respective associated phase adjuster circuits;
a plurality of terminating circuits, a respective terminating circuit of said plurality of terminating circuits being associated with each of said antennas for terminating a transmission line from the associated antenna; and
a plurality of terminating resistor reflection coefficient adjuster circuits, each terminating resistor reflection coefficient adjuster circuit connecting an associated one of said phase adjuster circuits to an associated one of said terminating circuits, for adjusting a reflection coefficient of an input signal fed thereto from said phase adjuster circuit; and
a transmitting circuit for transmitting a signal to said antennas, wherein:
said phase adjuster circuit is connected in a stage subsequent to said switching circuit viewed from said antennas,
said phase adjuster comprises a strip line or a coaxial line;
said switching circuit is responsive to a second control signal, generated externally of said switching circuit and indicating a transmission state, to connect said transmitting circuit to antennas, from among said plurality of antennas, which are assigned for transmission, and said terminating resistor reflection coefficient adjuster circuit comprises a capacitor and a reactance.

52. The diversity receiver claimed in claim 51, further comprising a determining and controlling circuit responsive to the radio waves received by each of said antennas, for indicating the one of said antennas having the best reception state, and for producing the control signal indicating said indicated antenna.

53. A diversity receiver, comprising:

a plurality of antennas;

a receiving circuit for receiving radio waves via said antennas;

a plurality of phase adjuster circuits, each of said antennas connected to an associated one of said phase adjuster circuits for adjusting the phase angle of the radio waves received by the associated antenna to increase the gain of each antenna to which said associated phase adjuster circuit is not connected;

a switching circuit continuously responsive, during reception of the radio waves, to a first control signal indicating one of said antennas having the best reception state to receive the radio waves, for connecting said indicated antenna to said receiving circuit, for disconnecting said indicated antenna from its associated phase adjuster circuit, and for connecting said non-indicated antennas to their respective associated phase adjuster circuits;

a plurality of terminating circuits, a respective terminating circuit of said plurality of terminating circuits being associated with each of said antennas for terminating a transmission line from the associated antenna; and a plurality of terminating resistor reflection coefficient adjuster circuits, each terminating resistor reflection coefficient adjuster circuit connecting an associated one of said phase adjuster circuits to an associated one of said terminating circuits, for adjusting a reflection coefficient of an input signal fed thereto from said phase adjuster circuit, wherein:

said phase adjuster circuit is connected in a stage subsequent to said switching circuit viewed from said antennas, said phase adjuster comprises a strip line or a coaxial line, said terminating circuit comprises a resistor, and said terminating resistor reflection adjustor circuit comprises a capacitor and a reactance.

54. The diversity receiver claimed in claim 53, further comprising a determining and controlling circuit responsive to the radio waves received by each of said antennas, for indicating the one of said antennas having the best reception state, and for producing the control signal indicating said indicated antenna.

55. A diversity receiver, comprising:

a plurality of antennas;

a receiving circuit for receiving radio waves via said antennas;

a plurality of phase adjuster circuits, each of said antennas connected to an associated one of said phase adjuster circuits for adjusting the phase angle of the radio waves received by the associated antenna to increase the gain of each antenna to which said associated phase adjuster circuit is not connected;

a switching circuit continuously responsive, during reception of the radio waves, to a control signal indicating one of said antennas having the best reception state to receive the radio waves, for connecting said indicated antenna to said receiving circuit, for disconnecting said indicated antenna from its associated phase adjuster circuit, and for connecting said non-indicated antennas to their respective associated phase adjuster circuits;

a plurality of terminating circuits, a respective terminating circuit of said plurality of terminating circuits being associated with each of said antennas for terminating a transmission line from the associated antenna; and a plurality of terminating resistor reflection coefficient adjuster circuits, each terminating resistor reflection coefficient adjuster circuit connecting an associated one of said phase adjuster circuits to an associated one of said terminating circuits, for adjusting a reflection coefficient of an input signal fed thereto from said phase adjuster circuit, wherein:

said phase adjuster circuit is connected in a stage subsequent to said switching circuit viewed from said antennas, and said terminating resistor reflection adjuster circuit includes a chip capacitor and a reactance.

56. The diversity receiver claimed in claim 55, further comprising a determining and controlling circuit responsive to the radio waves received by each of said antennas, for indicating the one of said antennas having the best reception state, and for producing the control signal indicating said indicated antenna.

57. A diversity receiver, comprising:

a plurality of antennas;

a receiving circuit for receiving radio waves via said antennas;

a plurality of phase adjuster circuits, each of said antennas connected to an associated one of said phase adjuster circuits for adjusting the phase angle of the radio waves received by the associated antenna to increase the gain of each antenna to which said associated phase adjuster circuit is not connected;

a switching circuit continuously responsive, during reception of the radio waves, to a first control signal indicating one of said antennas having the best reception state to receive the radio waves, for connecting said indicated antenna to said receiving circuit, for disconnecting said indicated antenna from its associated phase adjuster circuit, and for connecting said non-indicated antennas to their respective associated phase adjuster circuits;

a plurality of terminating circuits, a respective terminating circuit of said plurality of terminating circuits being associated with each of said antennas for terminating a transmission line from the associated antenna;

a plurality of terminating resistor reflection coefficient adjuster circuits, each terminating resistor reflection coefficient adjuster circuit connecting an associated one of said phase adjuster circuits to an associated one of said terminating circuits, for adjusting a reflection coefficient of an input signal fed thereto from said phase adjuster circuit; and a transmitting circuit for transmitting a signal to said antennas, wherein:

said phase adjuster circuit is connected in a stage subsequent to said switching circuit viewed from said antennas, said switching circuit is responsive to a second control signal, generated externally of said switching circuit and indicating a transmission state, to connect said transmitting circuit to antennas, from among said plurality of antennas, which are assigned for transmission, and said terminating resistor reflection coefficient adjuster circuit comprises a chip capacitor and a reactance.

58. The diversity receiver claimed in claim 57, further comprising a determining and controlling circuit responsive to the radio waves received by each of said antennas, for indicating the one of said antennas having the best reception state, and for producing the control signal indicating said indicated antenna.

59. A diversity receiver, comprising:

a plurality of antennas;

a receiving circuit for receiving radio waves via said antennas;

a plurality of phase adjuster circuits, each of said antennas connected to an associated one of said phase adjuster circuits for adjusting the phase angle of the radio waves received by the associated antenna to increase the gain of each antenna to which said associated phase adjuster circuit is not connected;

a switching circuit continuously responsive, during reception of the radio waves, to a first control signal indicating one of said antennas having the best reception state to receive the radio waves, for connecting said indicated antenna to said receiving circuit, for disconnecting said indicated antenna from its associated phase adjuster circuit, and for connecting said non-indicated antennas to their respective associated phase adjuster circuits;

a plurality of terminating circuits, a respective terminating circuit of said plurality of terminating circuits being associated with each of said antennas for terminating a transmission line from the associated antenna; and a plurality of terminating resistor reflection coefficient adjuster circuits, each terminating resistor reflection coefficient adjuster circuit connecting an associated one of said phase adjuster circuits to an associated one of said terminating circuits, for adjusting a reflection coefficient of an input signal fed thereto from said phase adjuster circuit, wherein:

said phase adjuster circuit is connected in a stage subsequent to said switching circuit viewed from said antennas, said terminating circuit comprises a resistor, and said terminating resistor reflection adjuster circuit comprises a chip capacitor and a reactance.

60. The diversity receiver claimed in claim 59, further comprising a determining and controlling circuit responsive to the radio waves received by each of said antennas, for indicating the one of said antennas having the best reception state, and for producing the control signal indicating said indicated antenna.

61. A transceiver, comprising a diversity receiver in accordance with claim 1.

62. A portable transceiver, comprising a diversity receiver in accordance with claim 1.

63. A diversity receiving method, comprising providing a plurality of antennas;

providing a receiving circuit for receiving radio waves via said antennas;

connecting a respective phase adjuster circuit to each said antenna;

in response to a control signal indicating the antenna of the plurality of antennas having the best reception for receiving external radio waves, connecting the indicated antenna to the receiving circuit, disconnecting the indicated antenna from its respective phase adjuster circuit, and connecting the non-indicated antennas to their respective phase adjuster circuits; and adjusting by one of said phase adjuster circuits a phase angle of a radio wave received by the respective one of the antennas to a value to increase the gain of each of the antennas to which said respective one of the phase adjuster circuits is not connected.

64. The diversity receiving method claimed in claim 63, further comprising:

connecting a respective transmission line to each antenna;

connecting a respective terminating resistor reflection coefficient adjuster circuit to each transmission line;

connecting a respective terminating circuit to each terminating resistor reflection coefficient adjuster circuit;

adjusting the terminating resistor reflection coefficient adjuster before the terminating means, circuits to adjust the reflection coefficient for an input signal fed to the terminating circuits to a larger value.

* * * * *